(12) United States Patent
Deman et al.

(10) Patent No.: US 11,236,794 B2
(45) Date of Patent: Feb. 1, 2022

(54) DISPENSING PUMP WITH POLYMER SPRING, BASE VENTING AND FLOW BAFFLE

(71) Applicant: Silgan Dispensing Systems Corporation, Grandview, MO (US)

(72) Inventors: Eelco H. Deman, Wallwijk (NL); Stefan Koster, Rotterdam (NL)

(73) Assignee: Silgan Dispensing Systems Corporation, Grandview, MO (US)

( * ) Notice: Subject to any disclaimer, the term of this patent is extended or adjusted under 35 U.S.C. 154(b) by 0 days.

(21) Appl. No.: 16/863,155

(22) Filed: Apr. 30, 2020

(65) Prior Publication Data

US 2020/0332853 A1 Oct. 22, 2020

Related U.S. Application Data

(63) Continuation-in-part of application No. 16/544,847, filed on Aug. 19, 2019, now Pat. No. 10,794,445, (Continued)

(51) Int. Cl.
*F16F 1/373* (2006.01)
*A47K 5/12* (2006.01)
(Continued)

(52) U.S. Cl.
CPC .......... *F16F 1/3732* (2013.01); *A47K 5/1205* (2013.01); *B05B 11/0037* (2013.01); *B05B 11/3001* (2013.01); *B05B 11/3023* (2013.01); *B05B 11/3076* (2013.01); *F16F 1/3605* (2013.01); *F16F 1/373* (2013.01); *F16F 1/377* (2013.01); *F16F 1/44* (2013.01);
(Continued)

(58) Field of Classification Search
CPC ........ F16F 1/3732; F16F 1/3605; F16F 1/377; F16F 1/373; F16F 1/44; F16F 1/36; A47K 5/1205; B05B 11/3001; B05B 11/0037; B05B 11/00416; B05B 11/3076; B05B 11/3077; B05B 11/3074
USPC .... 222/321.9, 321.1, 321.2, 321.7, 340, 341
See application file for complete search history.

(56) References Cited

U.S. PATENT DOCUMENTS

| 1,169,863 A | 2/1916 | Peycke |
| 1,816,325 A | 7/1931 | Held |

(Continued)

FOREIGN PATENT DOCUMENTS

| CH | 631249 A5 | 7/1982 |
| CN | 105605134 A | 5/2016 |

(Continued)

*Primary Examiner* — Lien M Ngo
(74) *Attorney, Agent, or Firm* — Barlow, Josephs & Holmes, Ltd.; Stephen J. Holmes

(57) ABSTRACT

A dispensing pump includes a polymer compression spring assembly, base vents and a flow baffle. The dispensing pump includes a pump base, and a dispensing head having a piston stem. The polymer compression spring assembly includes a slotted tubular spring element and first and second loading cones received at opposing ends of the slotted tubular spring element. The venting ports allow air to escape when capping the container after filling and the flow baffle reduces or prevents the product from being pulled into the pump accumulator before residual air (headspace) has been evacuated from the container during the initial priming strokes.

4 Claims, 41 Drawing Sheets

Related U.S. Application Data which is a continuation-in-part of application No. 16/163,685, filed on Oct. 18, 2018, now Pat. No. 10,495,173, which is a continuation of application No. 15/861,108, filed on Jan. 3, 2018, now Pat. No. 10,138,971.

(51) Int. Cl.

| | | |
|---|---|---|
| *F16F 1/36* | (2006.01) | |
| *B05B 11/00* | (2006.01) | |
| *F16F 1/44* | (2006.01) | |
| *F16F 1/377* | (2006.01) | |

(52) U.S. Cl.
CPC ....... *B05B 11/3047* (2013.01); *B05B 11/3074* (2013.01); *F16F 1/36* (2013.01)

(56) References Cited

U.S. PATENT DOCUMENTS

| | | | |
|---|---|---|---|
| 2,216,231 A | | 10/1940 | Dentler |
| 2,233,110 A | | 2/1941 | Piron |
| 2,254,781 A | | 9/1941 | Rabbitt |
| 2,289,790 A | | 7/1942 | Light |
| 2,570,371 A | | 10/1951 | O'Connor |
| 2,591,922 A | | 4/1952 | Dath |
| 2,724,588 A | | 11/1955 | Sheets |
| 3,134,585 A | | 5/1964 | Trask |
| 3,270,998 A | | 9/1966 | Keetch |
| 3,285,594 A | | 11/1966 | LaBelle |
| 3,331,600 A | | 7/1967 | Goetz et al. |
| 3,332,523 A | | 7/1967 | Chambers |
| 3,452,905 A | | 7/1969 | Micallef |
| 3,624,764 A | | 11/1971 | Goben |
| 3,709,478 A | | 1/1973 | Kisling, III |
| 3,724,833 A | | 4/1973 | Sergay |
| 3,796,288 A | | 3/1974 | Hollnagel |
| 3,866,724 A | | 2/1975 | Hollnagel |
| 4,010,940 A | | 3/1977 | Freyler |
| 4,073,858 A | | 2/1978 | Chung |
| 4,260,143 A | | 4/1981 | Kilger |
| 4,566,678 A | | 1/1986 | Anderson |
| 5,011,046 A | | 4/1991 | Graf |
| 5,030,490 A | | 7/1991 | Bronowicki |
| 5,092,495 A | * | 3/1992 | Andre ................ B05B 11/3088 222/321.2 |
| 5,174,421 A | | 12/1992 | Rink |
| 5,419,416 A | | 5/1995 | Miyashita |
| 5,437,439 A | | 8/1995 | Brokamp et al. |
| 5,447,257 A | | 9/1995 | Dark |
| 5,487,534 A | | 1/1996 | Sakamoto et al. |
| 5,518,377 A | | 5/1996 | Bougamont |
| 5,651,536 A | | 7/1997 | Daul |
| 5,992,704 A | * | 11/1999 | Jager-Waldau ..... B05B 11/0005 222/341 |
| 6,045,119 A | | 4/2000 | Erb |
| 6,053,371 A | | 4/2000 | Durfiat |
| 6,223,954 B1 | | 5/2001 | Carow |
| 6,401,752 B1 | | 6/2002 | Blackbourn |
| 6,470,910 B2 | | 10/2002 | Blackbourn et al. |
| 6,520,385 B2 | | 2/2003 | Bonningue |
| 6,986,444 B2 | | 1/2006 | Fuchs |
| 7,025,233 B2 | | 4/2006 | Masuda |
| 7,299,949 B2 | | 11/2007 | Greiner-Perth |
| 7,338,034 B2 | | 3/2008 | Aspengren et al. |
| 7,513,395 B2 | | 4/2009 | Labinski |
| 8,113,239 B2 | | 2/2012 | Richards |
| 8,402,999 B2 | | 3/2013 | Nini |
| 8,464,917 B2 | | 6/2013 | Nini |
| 8,465,009 B2 | | 6/2013 | Sprainis et al. |
| 8,474,664 B2 | | 7/2013 | Ophardt |
| 9,539,597 B2 | | 1/2017 | Ding |
| 9,580,292 B2 | | 2/2017 | Smith et al. |
| 9,937,509 B2 | * | 4/2018 | DeJong ............... B05B 11/3023 |
| 10,138,971 B1 | | 11/2018 | Deman |
| 10,464,088 B2 | * | 11/2019 | Knight ............... B05B 11/3061 |
| 10,473,176 B2 | | 11/2019 | Deman et al. |
| 10,495,173 B2 | | 12/2019 | Deman et al. |
| 10,526,191 B1 | | 1/2020 | Driskell et al. |
| 2004/0084820 A1 | | 5/2004 | Kato et al. |
| 2005/0281631 A1 | | 12/2005 | Bernstein |
| 2006/0208008 A1 | | 9/2006 | Sweeton |
| 2007/0045349 A1 | | 3/2007 | Foster |
| 2007/0119864 A1 | | 5/2007 | Tsai |
| 2010/0059470 A1 | | 3/2010 | Carlstedt et al. |
| 2010/0260632 A1 | | 10/2010 | Ophardt et al. |
| 2012/0267399 A1 | | 10/2012 | Moretti |
| 2013/0230423 A1 | | 9/2013 | Faneca Llesera |
| 2013/0292422 A1 | * | 11/2013 | Laible ................ B05B 11/3001 222/321.7 |
| 2013/0341366 A1 | | 12/2013 | Campbell |
| 2015/0069094 A1 | | 3/2015 | Maher et al. |
| 2015/0136810 A1 | | 5/2015 | Ding |
| 2016/0201755 A1 | | 7/2016 | Hufenbach |
| 2016/0318053 A1 | * | 11/2016 | De Jong ............ B05B 11/3077 |
| 2016/0332181 A1 | | 11/2016 | Deman |
| 2017/0128966 A1 | | 5/2017 | Law et al. |
| 2017/0190562 A1 | | 7/2017 | Trettin |
| 2017/0247239 A1 | | 8/2017 | Nini |
| 2017/0370756 A1 | | 12/2017 | A. Moreno Aparicio et al. |
| 2018/0186522 A1 | | 7/2018 | Kieras et al. |
| 2018/0188092 A1 | | 7/2018 | Kieras et al. |
| 2018/0304291 A1 | * | 10/2018 | Knight ............... B05B 11/3074 |
| 2019/0054486 A1 | | 2/2019 | Deman |

FOREIGN PATENT DOCUMENTS

| | | |
|---|---|---|
| CN | 111801510 A | 10/2020 |
| DE | 873333 C | 4/1953 |
| DE | 202007002054 U1 | 8/2007 |
| DE | 102010008194 A1 | 8/2011 |
| JP | 2011240992 A | 12/2011 |
| WO | 2007024387 A2 | 3/2007 |
| WO | 2015105715 A1 | 7/2015 |
| WO | 2017050394 A1 | 3/2017 |
| WO | 2019136002 | 7/2019 |
| WO | 2019136003 | 7/2019 |
| WO | 2019136004 | 7/2019 |

* cited by examiner

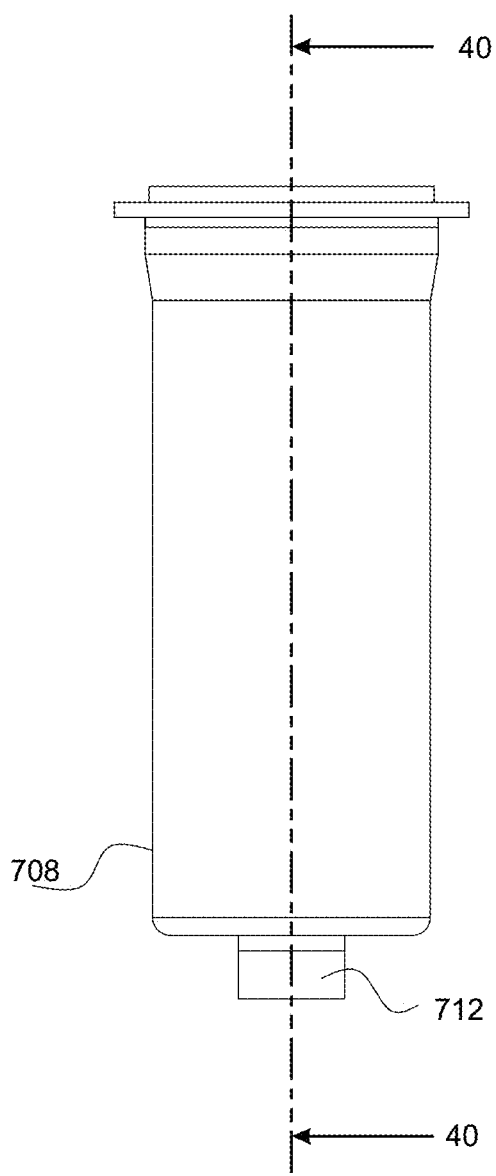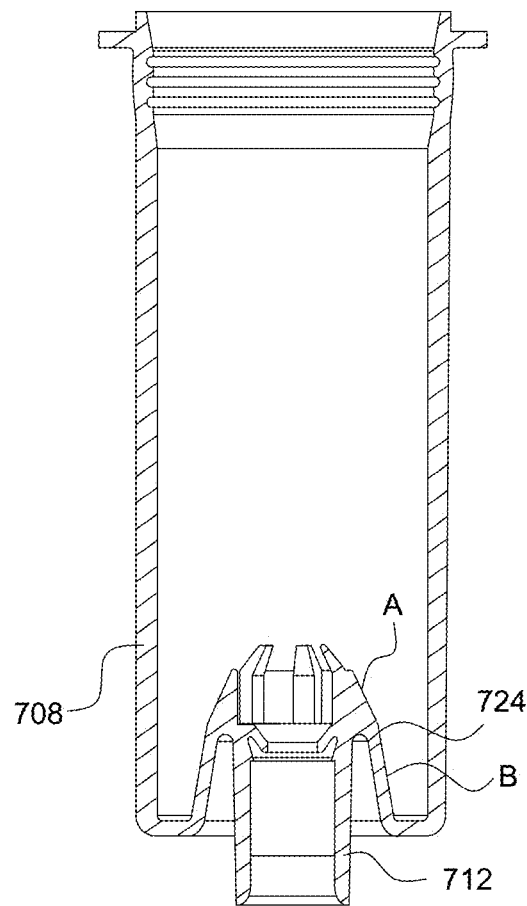
FIG. 39
FIG. 40

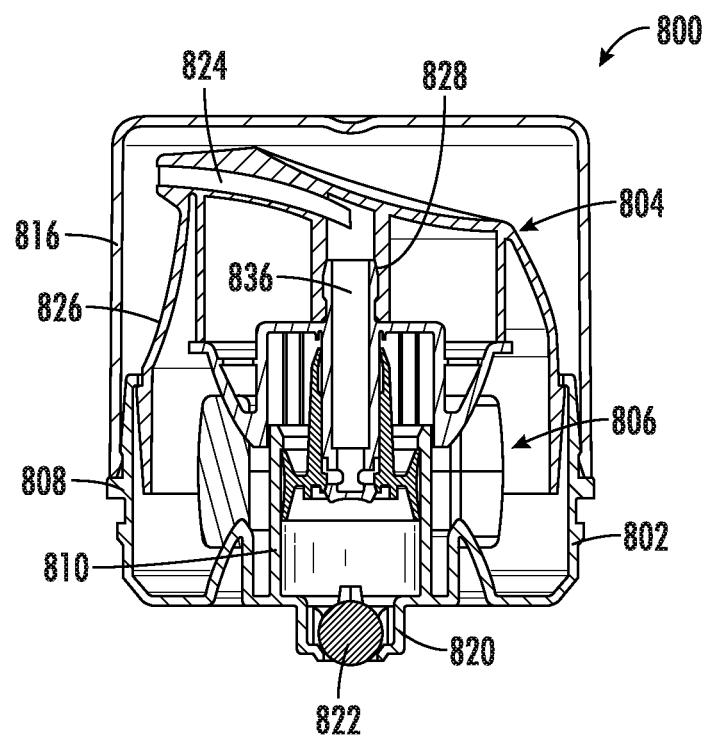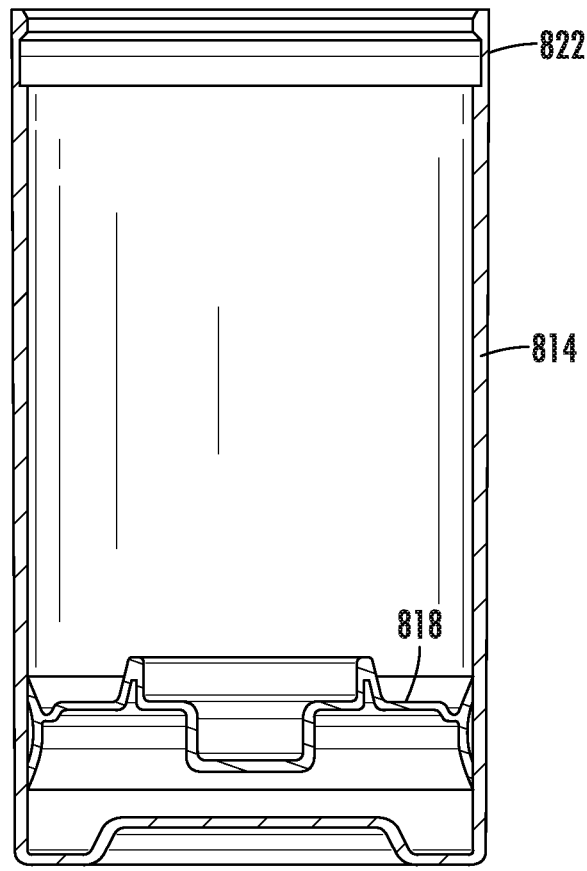
FIG. 51

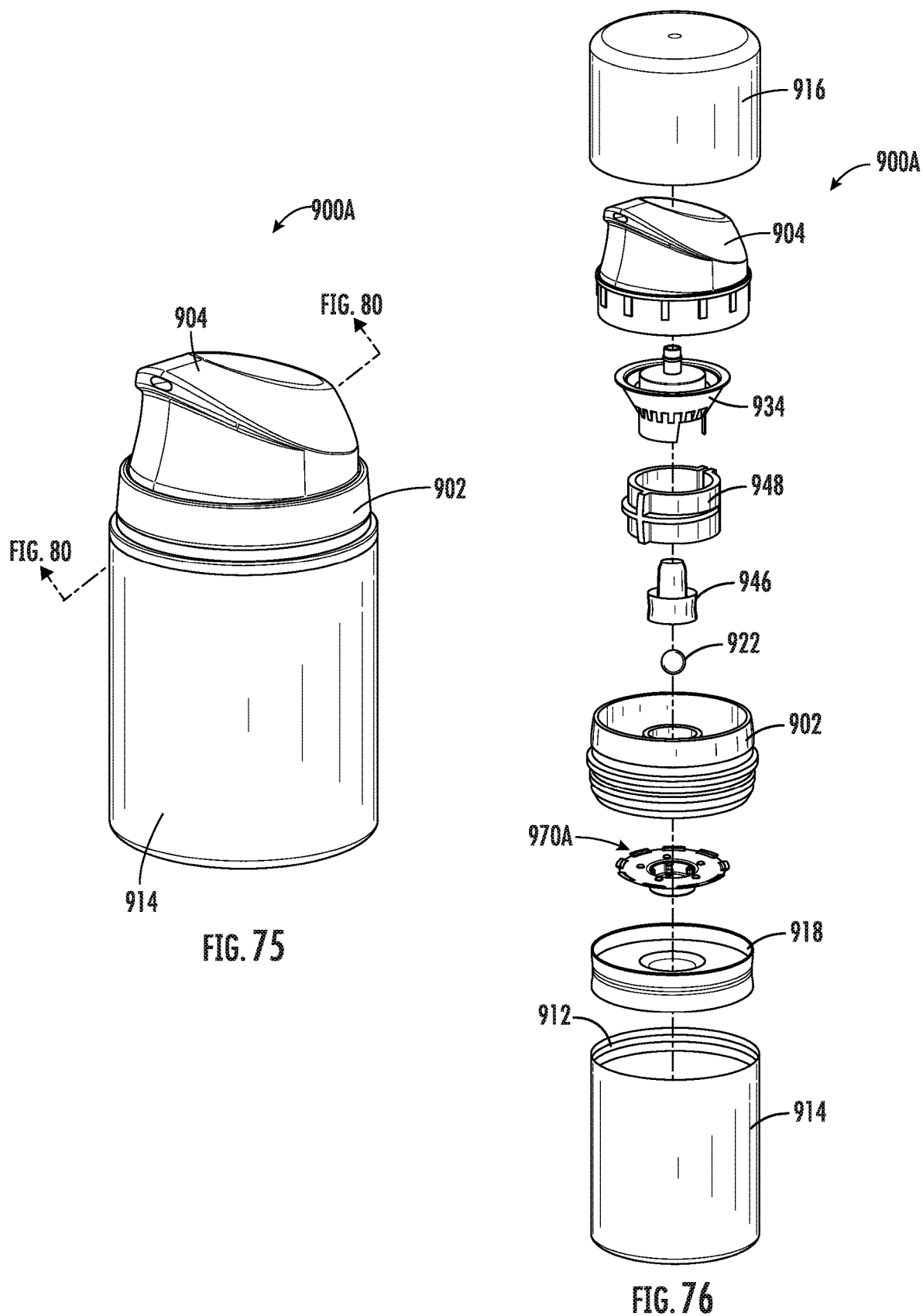

DISPENSING PUMP WITH POLYMER SPRING, BASE VENTING AND FLOW BAFFLE

CROSS-REFERENCE TO RELATED APPLICATIONS

This application is a continuation-in-part of U.S. application Ser. No. 16/544,847, filed Aug. 19, 2019, which is continuation-in-part of U.S. application Ser. No. 16/163,685, filed Oct. 18, 2018 which is a continuation of U.S. application Ser. No. 15/861,108, filed Jan. 3, 2018 and issued as U.S. Pat. No. 10,138,971 on Nov. 27, 2018.

BACKGROUND OF THE DISCLOSURE (1) Field of the Invention: The present invention generally relates to dispensing pumps for liquids, viscous flowable materials, foams, gels, etc. and more particularly to a dispensing pump with a polymer compression spring assembly.

(2) Description of Related Art: Dispensing pumps for various liquids, lotions, foams, gels, etc. are known in the art. They generally comprise a body portion which is seated on the neck of a container, a co-acting nozzle portion which slides relative to the body portion, and a spring structure which biases the co-acting nozzle portion to its normal rest position. To dispense the material in the container, the user manually depresses the nozzle which forces the material from the inside of the body portion outwardly through the nozzle. When the nozzle is released, the spring forces the nozzle portion back to its normal resting position. Most of the pump system components are typically formed from polymer materials, with the exception of the spring, which is typically formed from metal. The plastic pump components are easily recyclable. However, the presence of the metal spring in the pump assemblies has been found to impede or slow the recycling process due to the need to separate the metal spring from the other plastic components. Accordingly, there is a need in the industry for dispensing pump systems including all plastic spring assemblies.

SUMMARY OF THE INVENTION

Exemplary embodiments of a dispensing pump for liquids, viscous materials, foams, gels, etc. include a polymer compression spring assembly allowing the pump to be more easily recycled. The dispensing pump includes a pump base, and a dispensing head having an associated piston stem. The polymer compression spring assembly includes a slotted tubular spring element formed from a tensile polymer material and first and second loading cones received at opposing first and second ends of the slotted tubular spring element. The piston stem extends coaxially through the first loading cone, which is fixed on or in the pump base, and the second loading cone, which is axially movable with the piston stem and dispensing head. The tubular spring element is disposed coaxially about the piston stem between the first and second loading cones. When the dispensing head is compressed, the loading cones are axially compressible toward each other within the slotted tubular spring element whereby the slotted tubular spring element radially expands in tension to create an opposing radial contraction force, and in turn, an axial extension spring force. When released, the spring element elastically returns to its normal at rest shape, returning the loading cones and dispensing head to their normal at rest positions.

An exemplary embodiment of a compression spring assembly according to the present invention includes a slotted tubular spring element formed from a tensile polymer material, and first and second loading cones received at opposing first and second ends of the slotted tubular spring element. In some embodiments, both the spring element and the loading cones may be formed from polymer materials, making the spring assembly more easily recyclable.

In an exemplary embodiment, the slotted tubular spring element is cylindrical in shape and has a uniform wall thickness. The loading cones are generally conical in shape and preferably have at least one wall section with a wall angle of no less than 11 degrees. Wall angles of less than 11 degrees tend to create a friction lock while wall angles of greater than 11 degrees minimize stroke length and increase overall spring assembly diameter. The exemplary embodiment includes loading cones with a first frustoconical pre-loading wall section having a wall angle of greater than 11 degrees, and a second frustoconical primary loading wall section having a wall angle of 11 degrees.

The loading cones are axially compressible toward each other within the open ends of the slotted tubular spring element whereby the slotted tubular spring element radially expands in tension to create an opposing radial contraction force. Deformation of the tubular spring walls elastically stores energy which will return the spring to its normal at rest shape when released. When released, the spring element elastically contracts, in turn creating an axial extension force, and returns the cones to their normal at rest positions.

Some embodiments of the spring assembly include a modified spring element having strain reducing ribs extending along the opposing edges of the longitudinal slot. The ribs may include outwardly convex surfaces extending both radially outward and circumferentially outward from the slot edges. This embodiment further includes a first thinner wall thickness at the slot edges and a second thicker wall thickness diametrically opposed from the slot edges. The arcuate surface along with the increasing wall thickness moving away from the slot edges, more evenly distributes strain throughout the spring element and extends the life cycle of the spring element.

Other embodiments of the spring assembly may include a spring element which is hyperboloid in shape.

Still further embodiments of the spring element have thicker wall sections in select locations and strengthening ribs extending circumferentially around the spring and/or extending longitudinally along the height of the spring opposite the slot.

Some exemplary embodiments of the dispensing pump may include a pump base with venting ports around the peripheral sealing wall to allow air to escape when capping the container after filling.

Some exemplary embodiments of the dispensing pump may include a flow baffle disposed over the inlet port of the pump base to reduce or prevent the product from being pulled into the pump accumulator before residual air has (headspace) has been evacuated from the container during the initial priming strokes.

In some exemplary embodiments, all of the components of both the dispensing pump and the compression spring assembly are molded from the same plastic material making the entire dispensing pump easily recyclable in a single plastic material classification. Exemplary plastic materials include polypropylene (PP), high-density polyethylene (HDPE), and low-density polyethylene (LDPE). However, the disclosure should not be considered to be limited to these materials.

BRIEF DESCRIPTION OF THE DRAWINGS

While the specification concludes with claims particularly pointing out and distinctly claiming particular embodiments of the instant invention, various embodiments of the invention can be more readily understood and appreciated from the following descriptions of various embodiments of the invention when read in conjunction with the accompanying drawings in which:

FIG. 39 is a plan view of the accumulator;

FIG. 40 is a cross-sectional view thereof taken along line 40-40 of FIG. 39;

FIG. 51 is a cross-section view thereof;

FIG. 75 is a perspective view of yet another exemplary embodiment;

FIG. 76 is an exploded perspective view thereof;

DETAILED DESCRIPTION OF THE INVENTION

Figure 1:
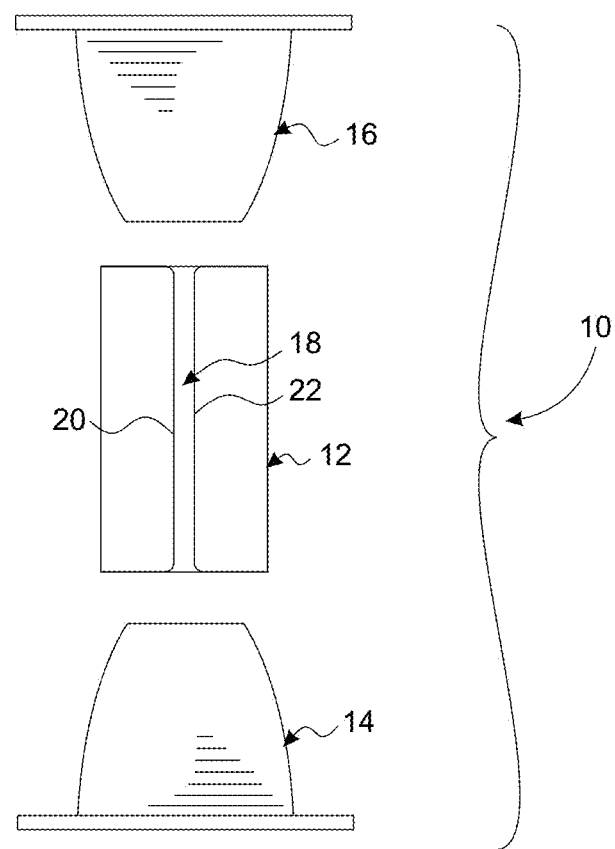
FIG. 1 is a plan view of an exemplary compression spring assembly in accordance with the present invention.

Referring now to the drawings, an exemplary embodiment of the present compression spring assembly is generally indicated at 10 in FIG. 1-12. According to the present invention, the compression spring assembly 10 comprises a slotted tubular spring element 12 formed from a tensile polymer material, and first and second loading cones 14, 16 received at opposing first and second ends of the slotted tubular spring element 12. In some embodiments, the loading cones 14, 16 may be formed from non-plastic materials, depending on the implementation. However, in the preferred embodiments as disclosed herein, both the spring element 12 and the loading cones 14, 16 are formed from polymer materials. Exemplary plastic materials include polypropylene (PP), high-density polyethylene (HDPE), and low-density polyethylene (LDPE). However, the disclosure should not be considered to be limited to these materials. In particular, the various components may be molded from HDPE and/or LDPE, making the entire spring assembly more easily recyclable.

Figure 2:
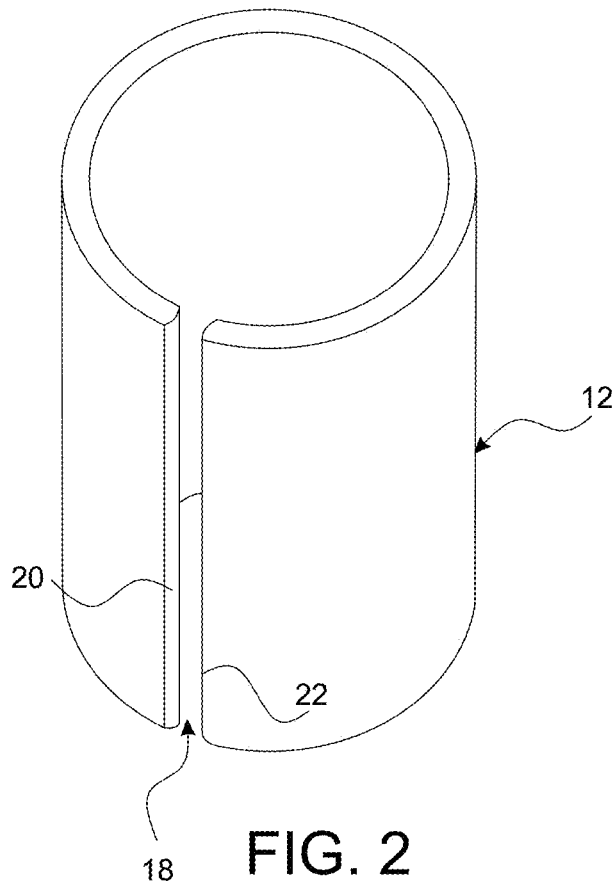
FIG. 2 is a perspective view of the slotted tubular spring element in an at rest condition.
Figure 3:
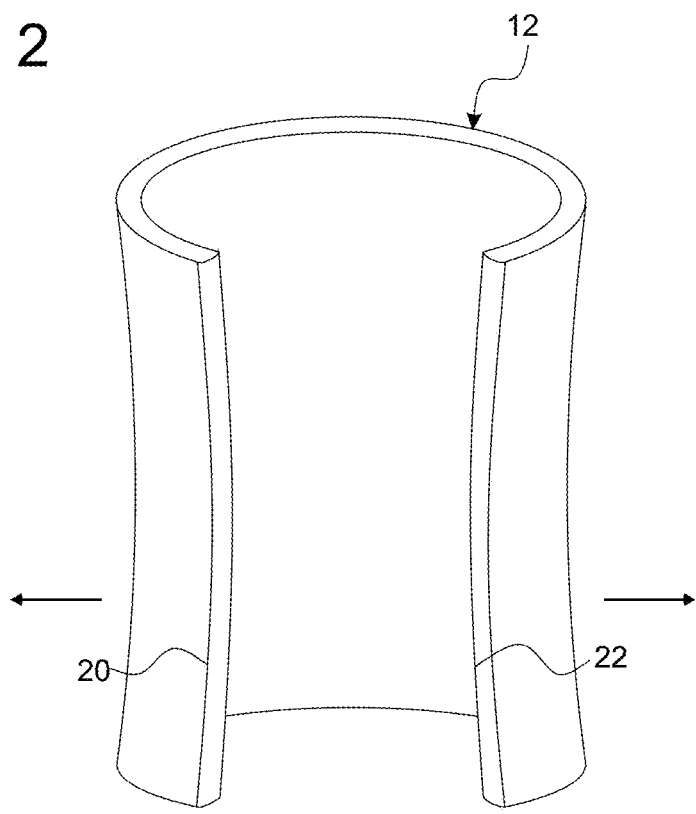
FIG. 3 is a perspective view of the slotted tubular spring element in a radially expanded condition.
Figure 4:
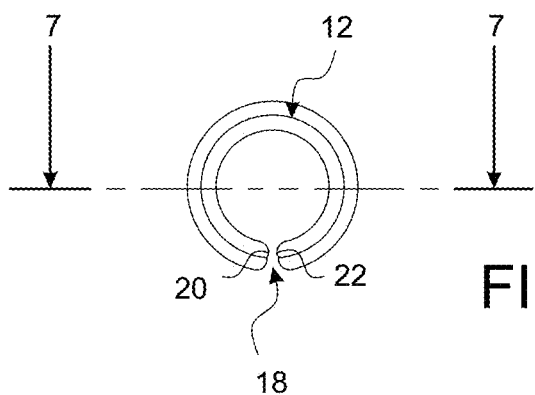
FIG. 4 is a top view of the spring element.
Figure 5:
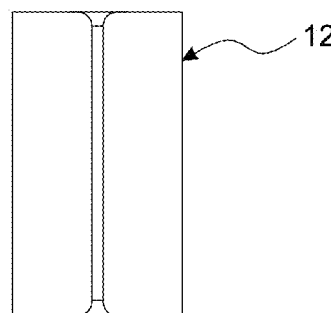
FIG. 5 is a front view thereof.
Figure 6:
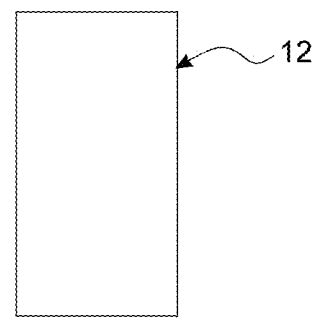
FIG. 6 is a side view thereof.
Figure 7:
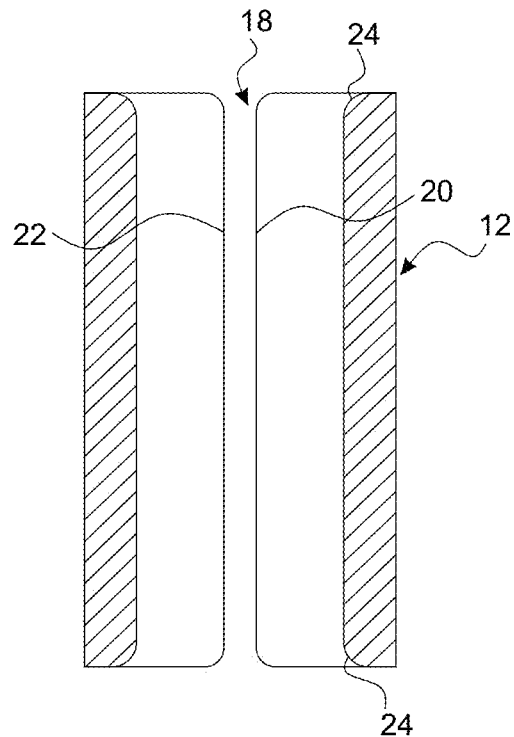
FIG. 7 is a cross-section view thereof taken along line 7-7 of FIG. 4.

In the exemplary embodiment, the slotted tubular spring element 12 is cylindrical in shape and has a uniform wall thickness (best illustrated in FIGS. 2 and 4). The spring element 12 includes a single longitudinal slot 18 which extends the entire length of the tube to define parallel opposing slot edges 20, 22. The slot 18 allows the element 12 to expand radially upon the application of an axial force at the first and second ends thereof. The inner wall edges are chamfered 24 to facilitate sliding of the walls over the loading cone surfaces 14, 16 (best illustrated in FIG. 7).

Figure 8:
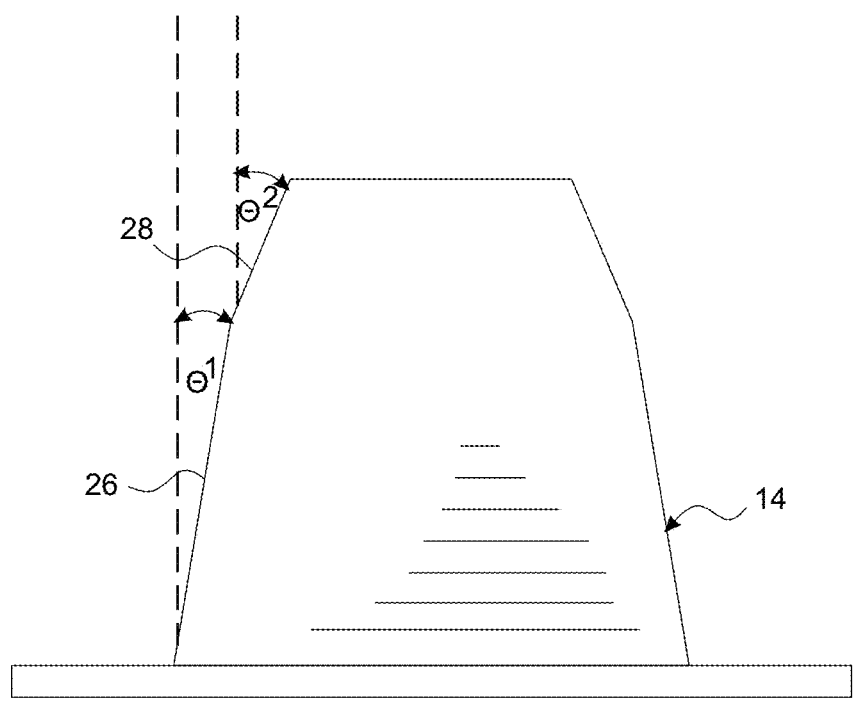
FIG. 8 is an enlarged plan view of the loading cone.

The loading cones 14, 16 are identical in shape and are symmetrically inverted to provide opposing axial compression and extension forces on the tubular spring element 12. Referring to FIG. 8, the loading cones 14, 16 (only 14 is shown) are generally conical in shape and preferably have at least one wall section (primary loading wall) 26 with a wall angle $\theta^1$ of no less than 11 degrees. In the present embodiment, a wall angle of less than 11 degrees tends to create a friction lock while a wall angle of greater than 11 degrees minimizes stroke length and increases overall spring assembly diameter. It should be understood that the critical wall angle for the primary loading wall 26 is based on the type of material used, i.e. polymer or metal, and other factors such as surface finish, shape of wall chamfers, etc. The angle must be selected such that the spring force from the spring element 12 overcomes friction as well as displacement of the applied axial load. The exemplary embodiment, which has an intended use in dispensing pumps for viscous liquids, includes loading cones 14, 16 with a first frustoconical pre-loading wall section 28 having a wall angle $\theta^2$ of greater than 11 degrees, and a second frustoconical primary loading wall section 26 having a wall angle $\theta^1$ of 11 degrees. The steeper pre-load angle $\theta^2$ facilitates the initial expansion of the spring element 12.

Figure 9:
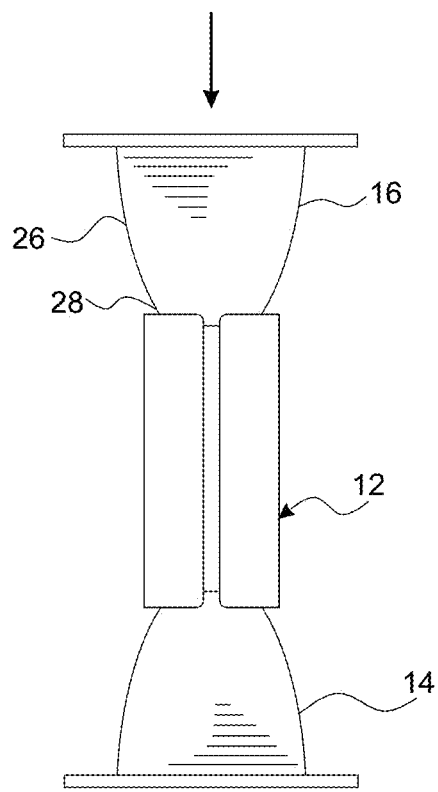
FIGS. 9-12 are sequential views of the compression spring assembly being axially loaded and released.
Figure 10:
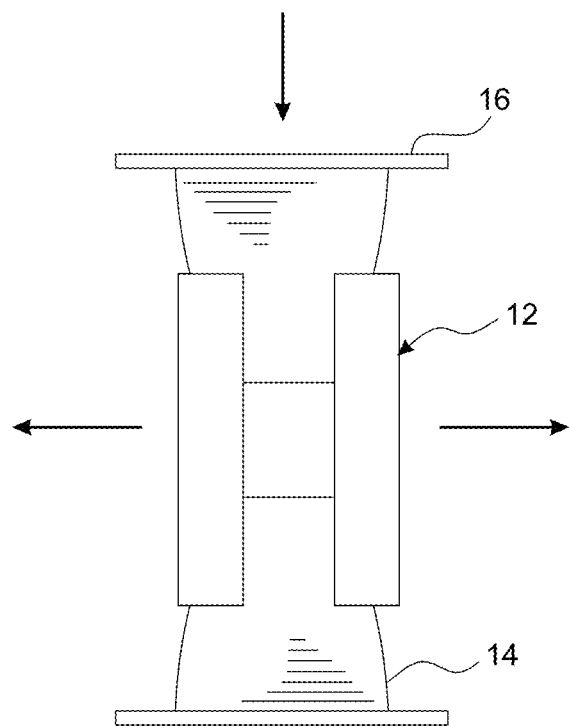
Figure 11:
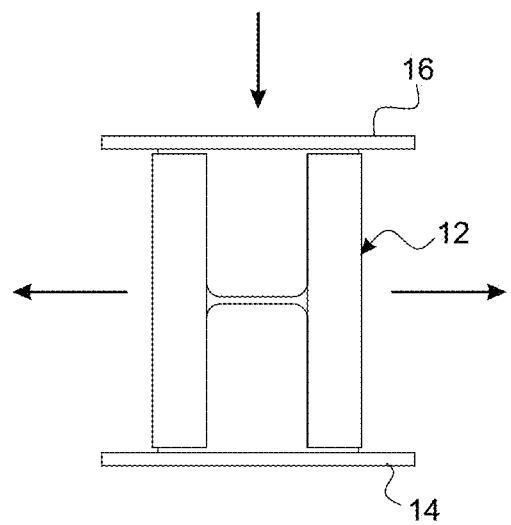
Figure 12:
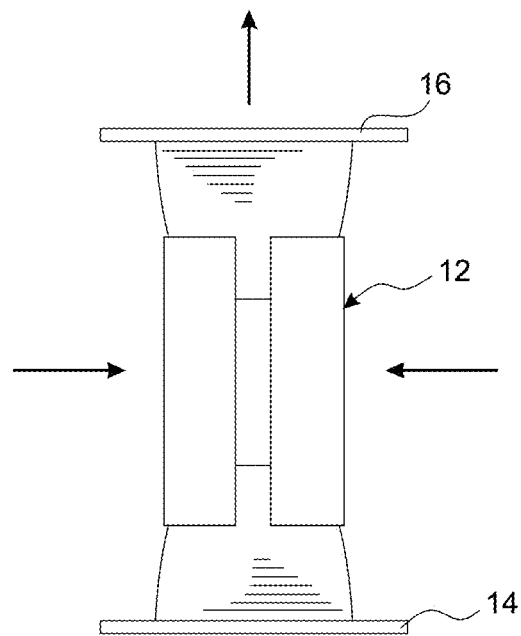

Turning to FIGS. 9-12, the loading cones 14, 16 are axially compressible toward each other within the open ends of the slotted tubular spring element 12 whereby the slotted tubular spring element 12 radially expands in tension to create an opposing radial contraction force. FIG. 9 illustrates an initial at rest state. FIG. 10 illustrates initial pre-load and outward expansion of the spring element. FIG. 11 illustrates full axial compression and load. Deformation of the tubular spring element 12 elastically stores energy which will return the spring element 12 to its normal at rest shape when released. When released as illustrated in FIG. 12, the spring element 12 elastically contracts (inward), in turn creating an axial extension force, and returns the cones 14, 16 to their normal at rest positions.

Figure 13:
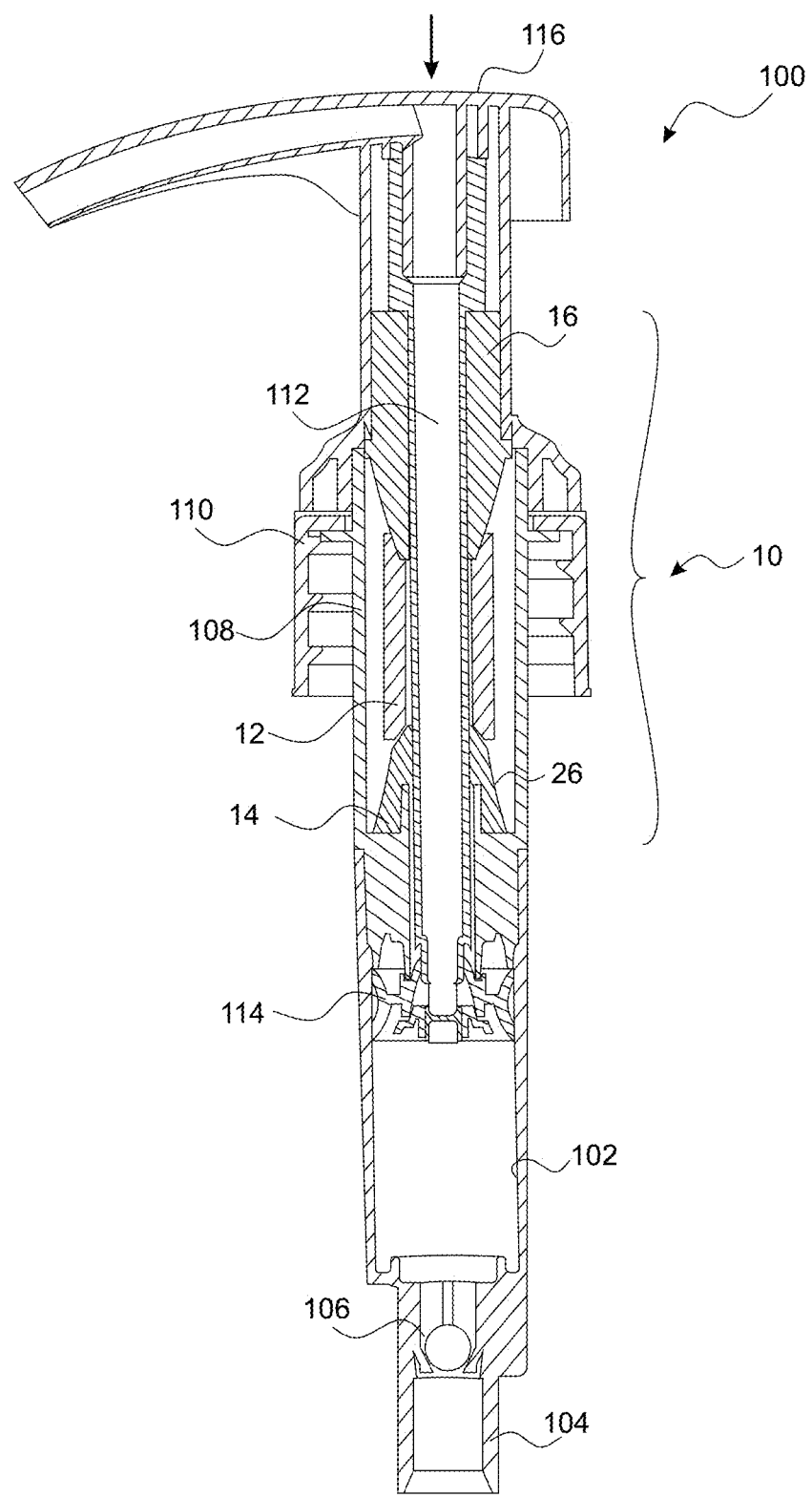
FIG. 13 is a cross-sectional view of an exemplary dispensing pump incorporating the present compression spring assembly.
Figure 14:
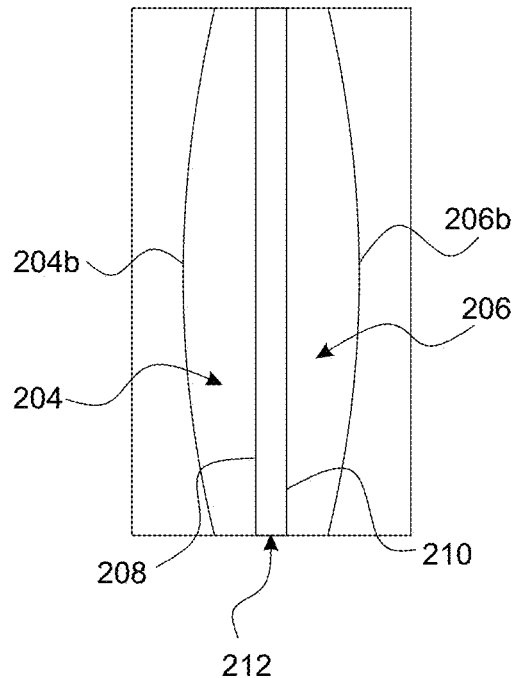
FIG. 14 is a front view of another exemplary embodiment of the slotted tubular spring element including strain reducing ribs.
Figure 15:
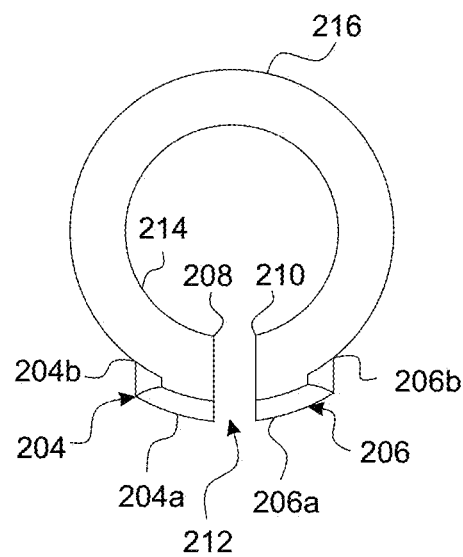
FIG. 15 is a top view thereof.

Turning to FIG. 13, embodiments of the present polymer compression spring 10 may be advantageously used in a dispensing pump 100 for various liquids, lotions, etc. contained within a bottle or other container (not illustrated). In some exemplary embodiments, all of the components of both the dispenser pump 100 and the compression spring assembly 10 are molded from the same plastic material making the entire dispensing pump 100 including the spring assembly 10 easily recyclable in a single plastic material classification.

The dispensing pump 100 comprises an accumulator cup 102 having a clip tube receptacle 104 and ball valve 106 at a lower end thereof. A tubular guide 108 is received in the upper end of the accumulator cup 102, and the tubular guide 108 is secured on a container neck (not shown) with a threaded cap ring 110. The present compression spring assembly 10 is received and guided within the tubular guide 108. As noted above, the angle $\theta^1$ of the loading wall 26 of the loading cones 14, 16 is a critical factor in determining overall spring assembly diameter. As seen in this pump embodiment 100, the spring assembly 10 fits within the inner walls of the guide 108 which in turn must fit within the neck of the container. Accordingly, the wall angle, spring element material and profile are all factors in determining this specification. A piston rod 112 is received axially through the loading cones 14, 16 and the tubular spring element 12 and extends through the bottom of the guide 108 into the accumulator cup 102 wherein the terminal end is fitted with a piston 112 which forms a seal with the inner wall of the accumulator 102. A nozzle head 116 is secured to the upper end of the piston rod 112 and received over the upper loading cone 16.

In operation, a forcible downward compression of the nozzle head 116 causes a corresponding downward axial movement of the upper loading cone 16 and outward deflection and loading of the spring element 12 as per the illustrations earlier described in FIGS. 9-12. Upon the subsequent release of the nozzle head 116, the tubular spring element 12 elastically contracts back to its normal at rest shape and position (see also FIG. 12), causing a forcible upward movement of the upper loading cone 16, piston rod 112, piston 114 and nozzle head 116 back to their normal at rest positions. The pump assembly 100 and ball valve 106 operate as known in the art to draw material up from the dip tube 104 and dispense the material through the nozzle head 116.

Figure 17:
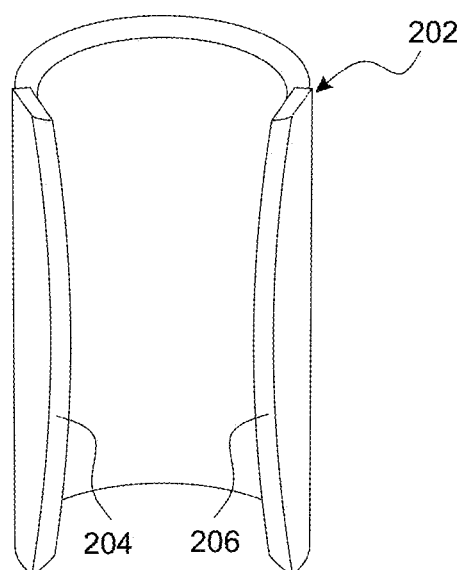
FIG. 17 is a perspective view thereof in a radially expanded condition.
Figure 16:
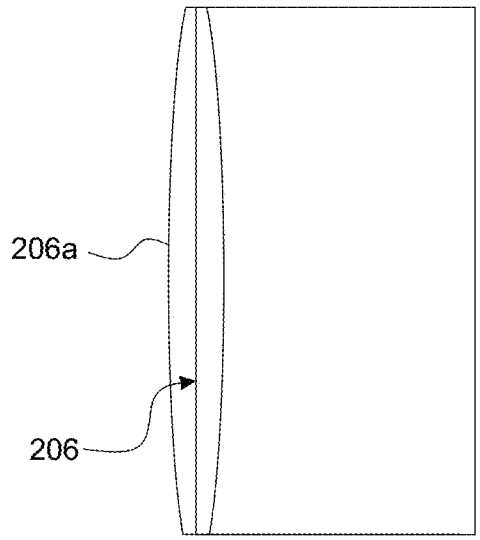
FIG. 16 is a side view thereof.
Figure 18:
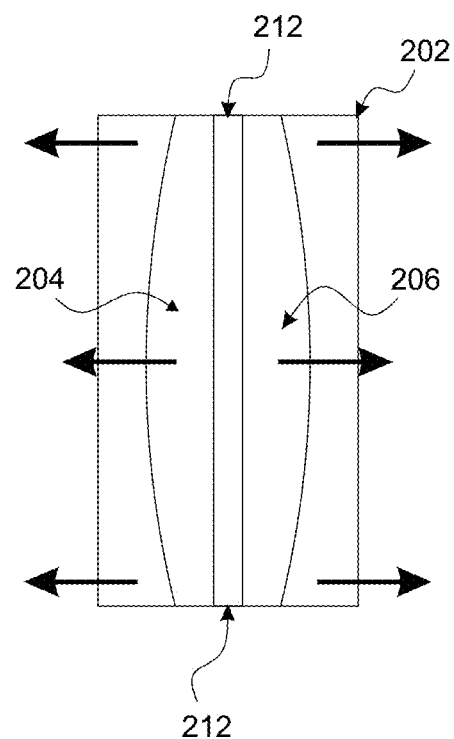
FIGS. 18 and 19 are side and front views thereof showing the bending vectors of the ribs when the spring element is expanded.
Figure 19:
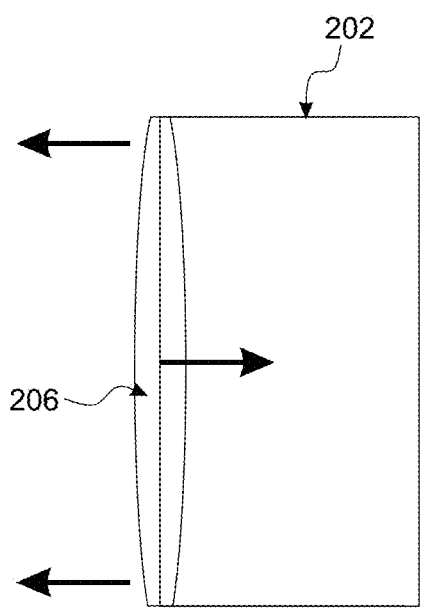
Figure 20:
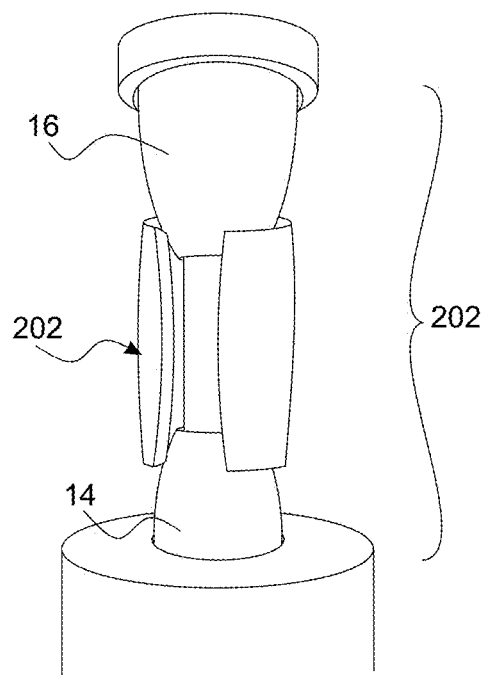
FIG. 20 is an illustration showing initial axial compression of the spring assembly.
Figure 21:
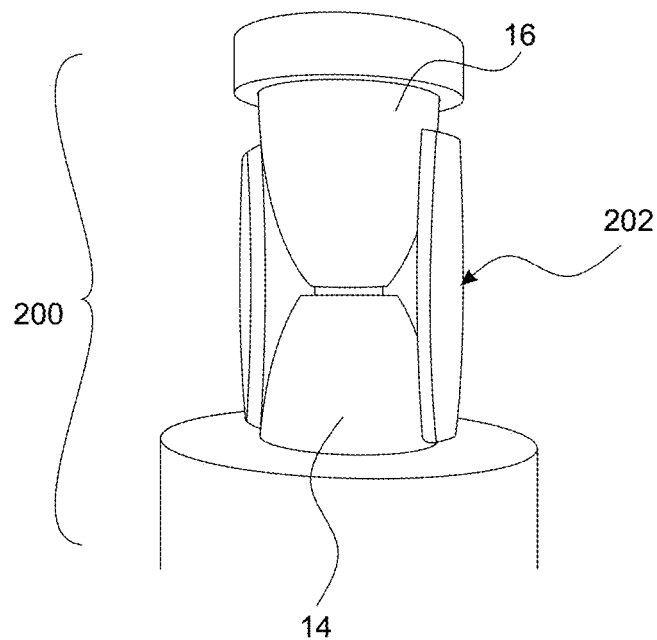
FIG. 21 is another illustration showing full axial compression of the spring assembly.

Turning now to FIGS. 14-21, some embodiments of the spring assembly 200 may include a modified slotted tubular spring element 202 having strain reducing ribs 204, 206 extending along the opposing edges 208, 210 of the longitudinal slot 212. The ribs 204, 206 may include symmetrical convex surfaces extending both radially outward 204a, 206a (See FIGS. 15 and 16) and circumferentially outward 204b, 206b (See FIG. 14) from the slot edges 208, 210. This embodiment 202 further includes a first thinner wall thickness 214 at the slot edges 208, 210 adjacent the strain ribs 204, 206 and a second thicker wall thickness 216 diametrically opposed from the slot edges 208, 201 (See FIG. 15). The arcuate surfaces 204a, 204b, 206a, 206b along with the increasing wall thickness moving away from the slot edges 208, 210 more evenly distributes strain throughout the entire spring element 202 and extends the life cycle of the spring element 202. FIG. 17 illustrates the spring element 202 in an expanded loaded state. FIGS. 18 and 19 illustrate the movement vectors (arrows) associated with the corners of the slot edges 208, 210. The reduced material volume in these areas allow these corners to more easily deform and reduce strain. The present spring element 202 is used in combination with the same loading cones 14, 16 as previously described. FIGS. 20 and 21 show axial compression of the present embodiment 200 with exemplary loading cones 14, 16. The present spring assembly 200 can be used in the same types of dispensing pumps 100 as described above with improved spring longevity.

Figure 22:
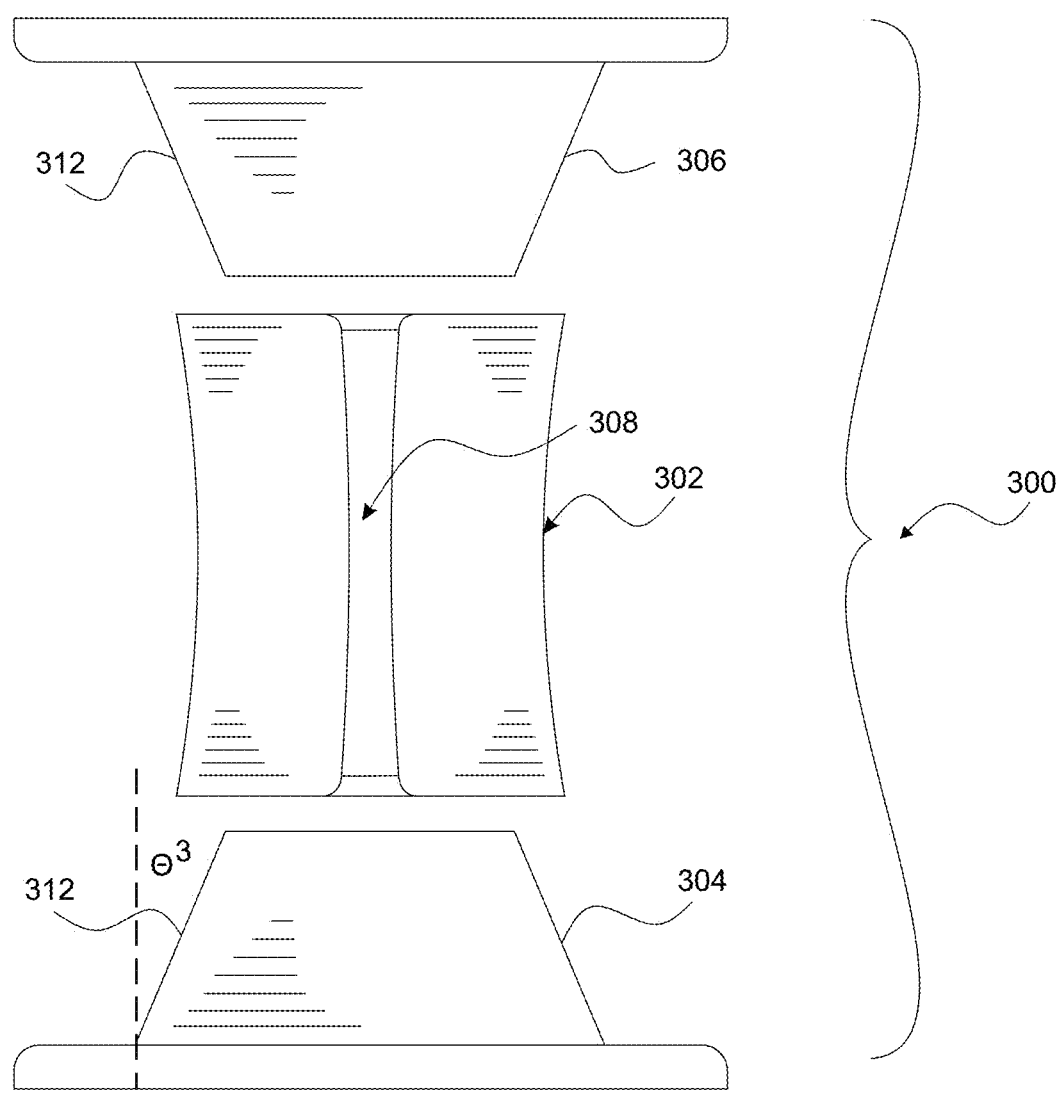
FIG. 22 is a plan view of another exemplary compression spring assembly including a hyperboloid spring element.
Figure 23:
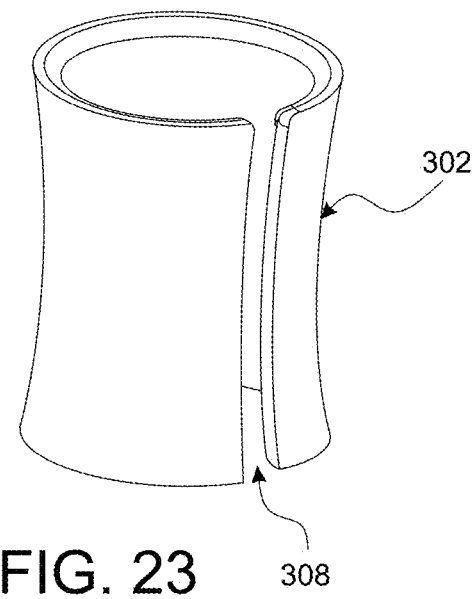
FIG. 23 is a perspective view of the hyperboloid slotted spring element.
Figure 24:
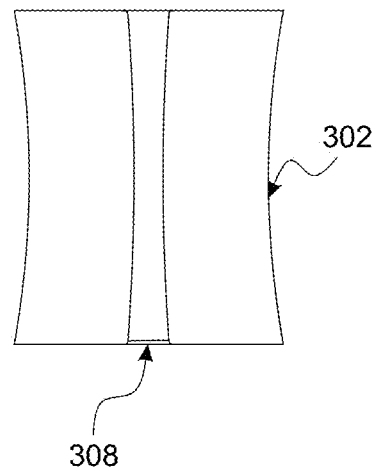
FIG. 24 is a front view thereof.
Figure 25:
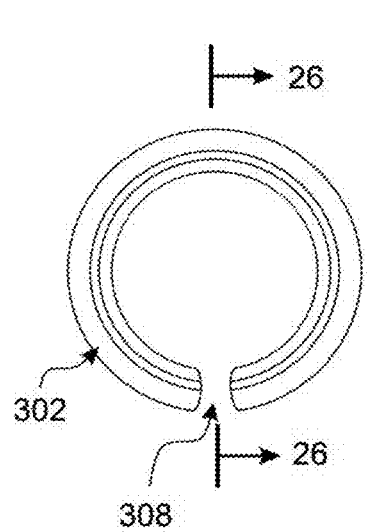
FIG. 25 is a top view thereof.
Figure 26:
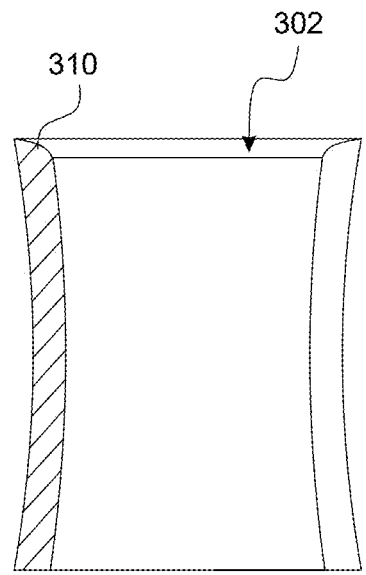
FIG. 26 is a cross-sectional view thereof taken along line 26-26 of FIG. 25.

Referring now to FIGS. 22-28, other embodiments of the compression spring assembly 300 include a slotted tubular spring element 302 which is hyperboloid in shape, i.e.

having a smaller (narrower) diameter at the center and symmetrically larger diameters at the ends, and first and second opposed loading cones 304, 306. The spring element 302 has a uniform wall thickness (See FIGS. 25 and 26) and includes a single longitudinal slot 308 (FIGS. 23 and 24) which extends the entire length of the tube, allowing the spring element 302 to expand radially upon the application of an axial force at the first and second ends thereof. The curved spring wall of the hyperboloid spring 302 is provides a stiffer loading profile (higher loading profile) using the same amount of plastic material as compared with the earlier described cylindrical shape (FIGS. 1-12). The inner wall edges are also chamfered 310 to facilitate sliding of the spring element 302 over the loading cone wall surfaces 304, 306 (See FIG. 26). The hyperboloid shape of the spring element 302 works more efficiently with loading cones 304, 306 having a single frustoconical loading wall 312 with a somewhat steeper wall angle $\theta^3$ (FIG. 22). The preferred embodiment as illustrated shows a wall angle $\theta^3$ of greater than 11 degrees. As noted above, the particular wall angle $\theta$ is selected based on the tensile characteristics of the spring element 302 as well as material and surface finishes. The exemplary embodiments are intended to be illustrative but not limiting.

Figure 27:
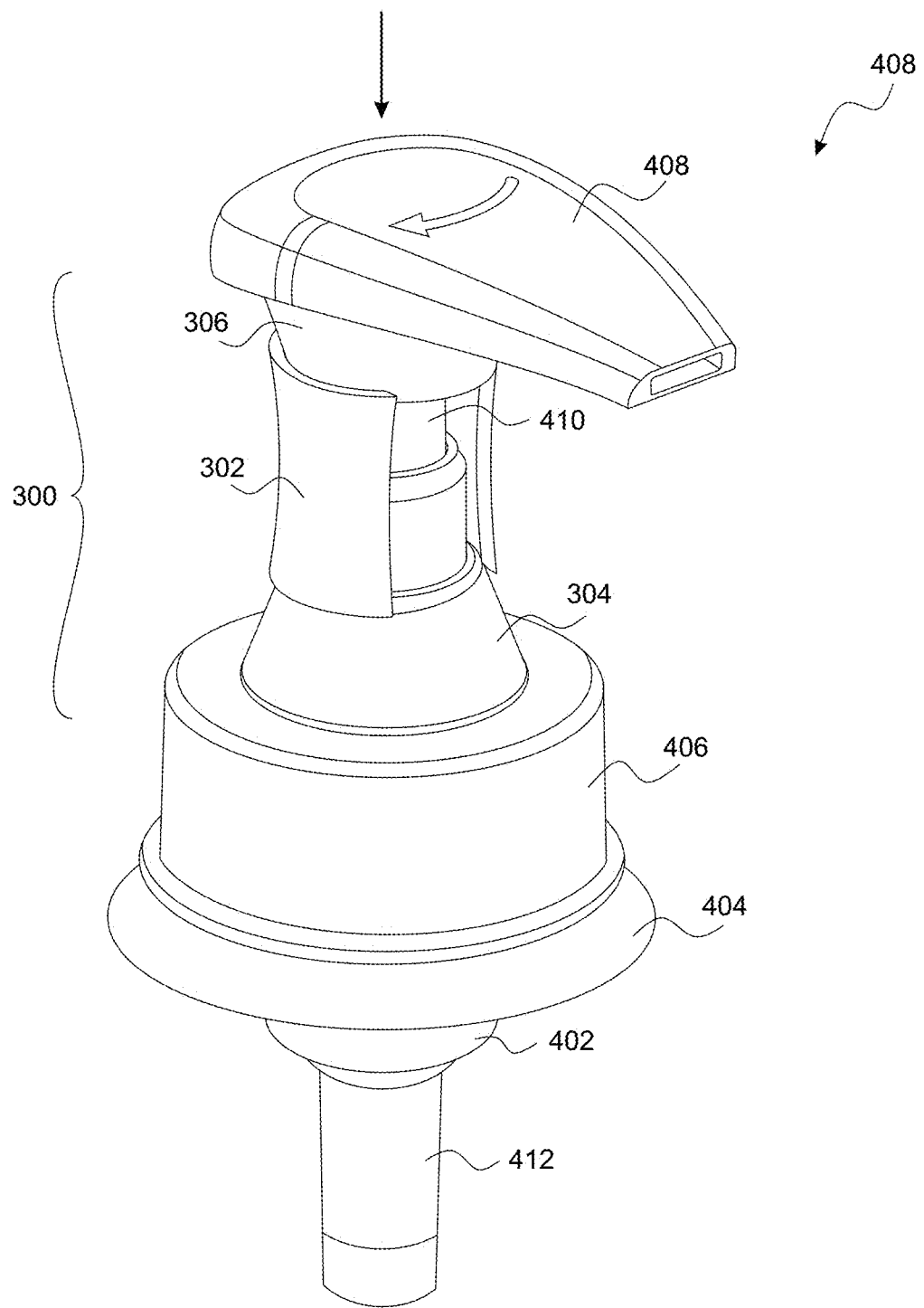
FIG. 27 is a perspective view of an exemplary dispensing pump incorporating a hyperboloid compression spring assembly.
Figure 28:
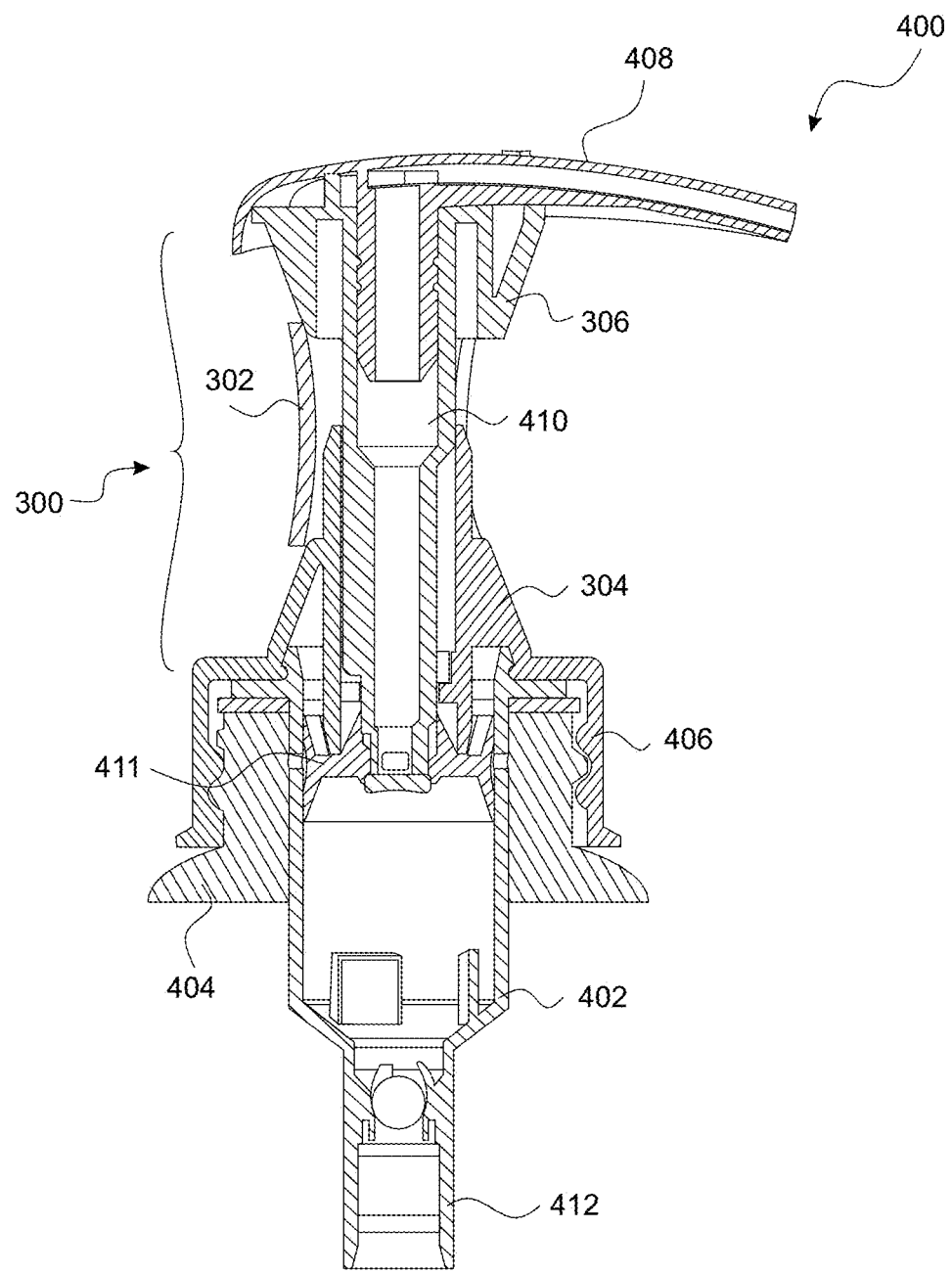
FIG. 28 is a cross-sectional view thereof taken along line 28-28 of FIG. 27.

Turning to FIGS. 27 and 28, the present hyperboloid compression spring assembly 300 lends itself to be advantageously used as an exterior spring return in certain dispensing pumps 400 for various liquids, lotions, etc. As described above, in many exemplary embodiments, all of the components of both the dispenser pump 400 and the compression spring assembly 300 are molded from the same plastic material making the entire dispensing assembly easily recyclable in a single plastic material classification.

Referring to FIGS. 27-28, the dispensing pump 400 comprises an accumulator cup 402 which is secured within the neck of a container 404 with a threaded closure 406. A nozzle head 408 is received on a piston stem 410 which extends through the closure 406 and into the accumulator 402. A piston seal 411 is received on the terminal end of the piston stem 410, forming a seal with the inner walls of the accumulator. The loading cones 304, 306 of the present hyperboloid compression spring assembly 300 are integrated into the opposing exterior surfaces of the closure 406 and the top end of the piston stem 410 and the hyperboloid slotted tubular spring element 302 is snap received over and around the piston stem 410 and upward cone extension 304 of the closure 406 so that it engages the ramped loading cone walls 304, 306 of the piston stem 410 and closure 406.

In operation, a forcible downward compression of the nozzle head 408 causes a corresponding downward axial movement of the upper loading cone (piston stem head) 410/306 and outward deflection and loading of the spring element 302 similar to the illustrations earlier described in FIGS. 9-12. Upon the subsequent release of the nozzle head 408, the tubular spring element 302 elastically contracts (radially inward) back to its normal at rest shape and position, causing a forcible upward movement of the upper loading cone (piston stem) 410/306 and nozzle head 408 back to their normal at rest positions. The pump assembly 400 operates as known in the art to draw material up from a clip tube connection 412 and dispense the material through the nozzle head 408.

Figure 29:
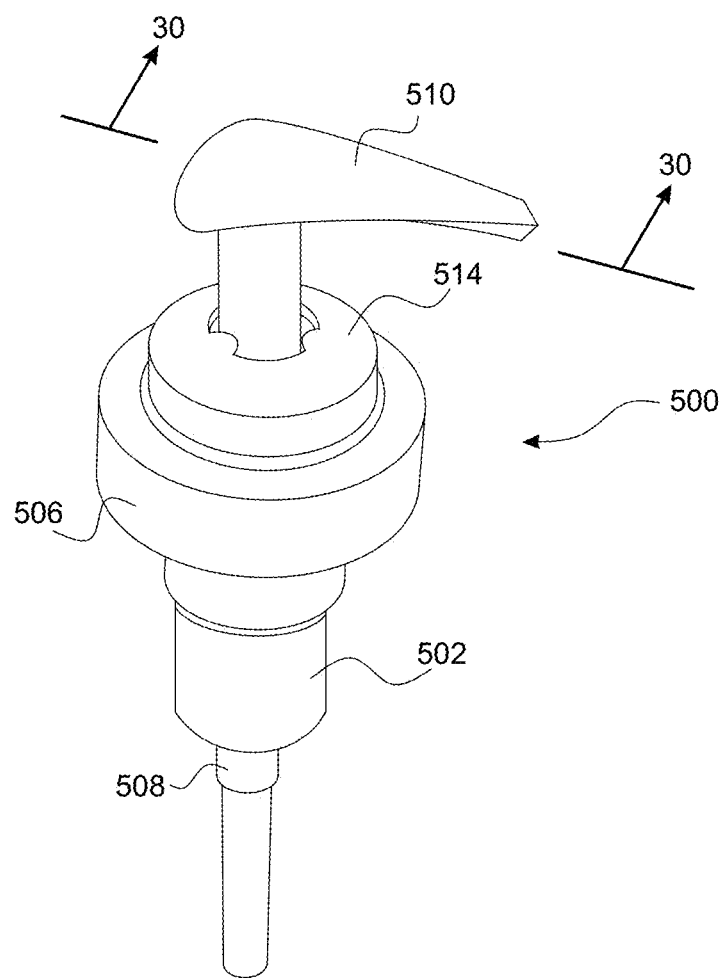
FIG. 29 is a perspective view of another exemplary embodiment.
Figure 30:
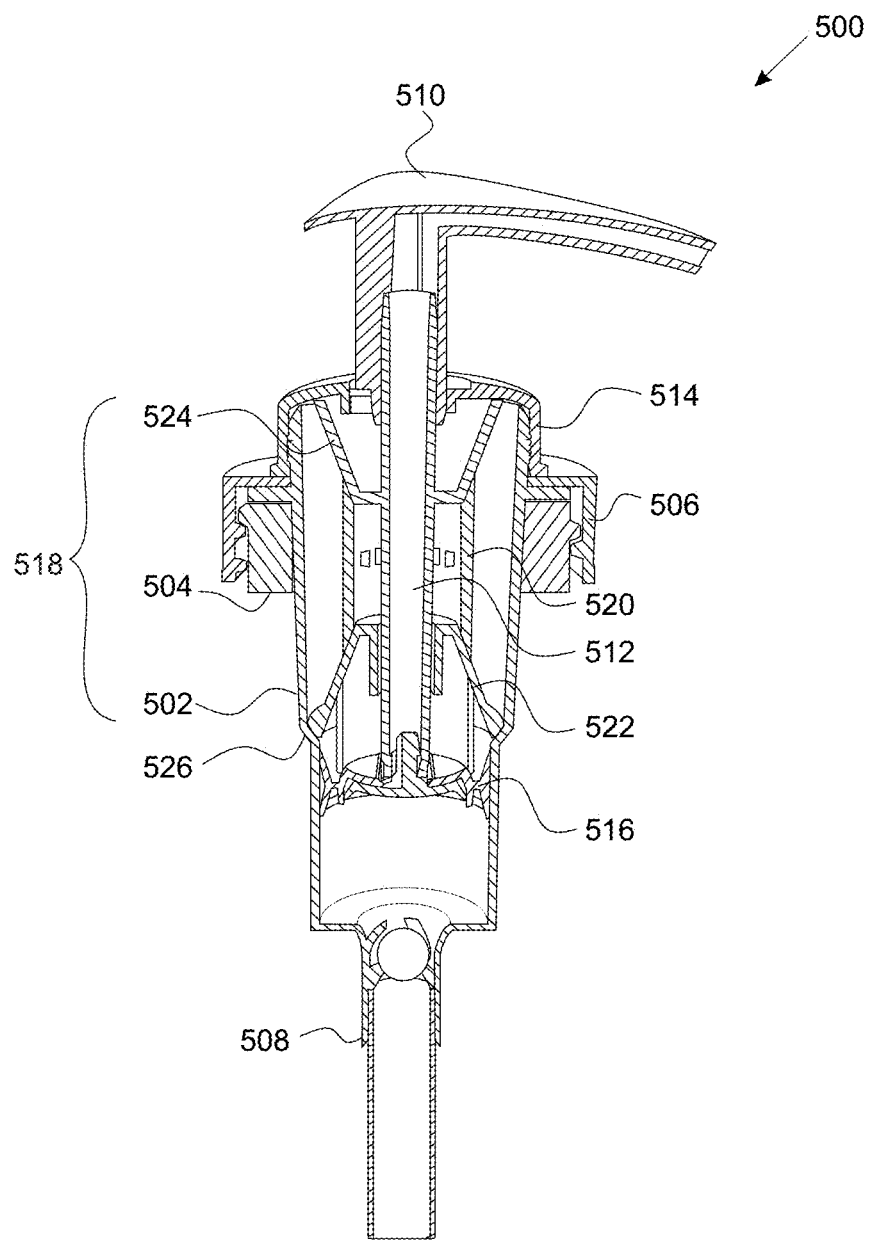
FIG. 30 is a cross-sectional view thereof taken along line 30-30 of FIG. 29.

Referring to FIGS. 29 and 30, another exemplary pump dispenser embodiment is illustrated and generally indicated at 500. The dispensing pump 500 comprises an accumulator 502 which is secured within the neck of a container 504 with a threaded closure 506. The accumulator 502 has a dip tube inlet 508 formed in the bottom wall thereof. A nozzle head 510 is received on a piston stem 512 which extends through a second closure ring 514 secured at the top of the accumulator 502 and into the accumulator 502. A piston seal 516 received on the terminal end of the piston stem 512, forming a seal with the inner walls of the accumulator 502. The compression spring assembly 518 is received within the accumulator 502, similar to the embodiment in FIG. 13, and comprises a cylindrical slotted tubular spring element 520 and first and second loading cones 522, 524. The first loading cone 522 of the present embodiment is an independent component which is seated on a shoulder 526 formed on the accumulator wall. The piston stem 512 extends coaxially through the first loading cone 522 such that the piston seal 516 is located below the first loading cone 522. The second loading cone 524 is integrated into the exterior surface of the piston stem 512. It is noted here that the loading cones 522, 524 have a single uniform loading surface. The slotted tubular spring element 520 is received coaxially around the piston stem 512 and between the first and second loading cones 522, 524.

Operation of the dispensing pump 500 is similar to that described with respect to the embodiment in FIG. 13.

Figure 31:
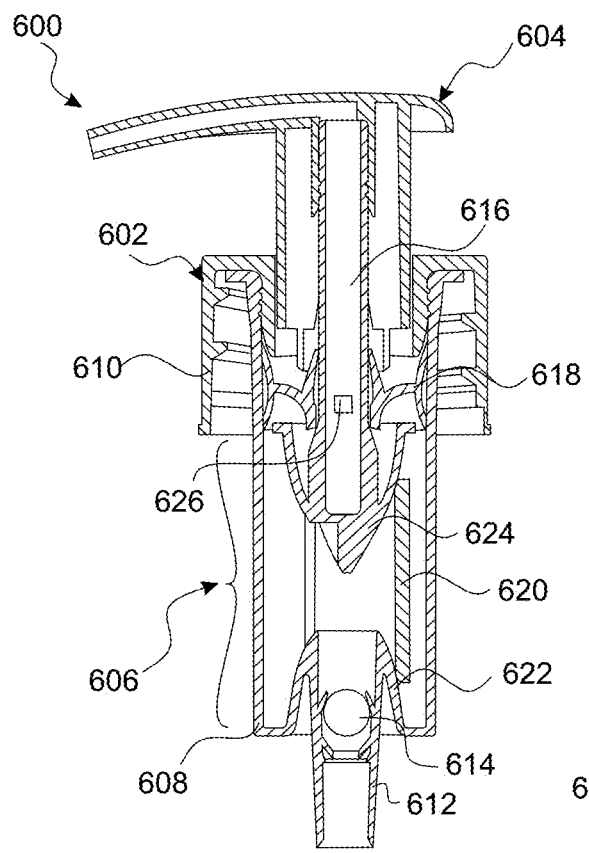
FIGS. 31-34 are cross-sectional views of additional exemplary embodiments.

Referring to FIG. 31, another exemplary embodiment is illustrated and generally indicated at 600. The dispensing pump 600 generally comprises a pump base 602, a dispensing head 604 and a polymer compression spring assembly 606. The pump base includes an accumulator 608 secured within the neck of a container (not shown) with a threaded closure 610. The accumulator 608 has a dip tube inlet 612 formed in the bottom wall thereof and a ball valve 614 is located within the dip tube inlet 612. The dispensing head 604 is received on the top end of a piston stem 616 which extends through the threaded closure 610 and into the accumulator 608. A piston seal 618 is received on the piston stem 616 midway along the length of the piston stem. The compression spring assembly 606 is received within the accumulator 608, and comprises a cylindrical slotted tubular spring element 620 and first and second loading cones 622, 624. The first loading cone 622 of the present embodiment is integrally formed with the bottom wall of the accumulator 608 extending upwardly around the dip tube inlet 612 and ball valve 614. The second loading cone 624 is integrated into the terminal end of the piston stem 616. It is noted here that the piston stem 616 extends coaxially through the piston seal 618 such that the piston seal 618 is located above the second loading cone 624. The loading cones 622, 624 have both a preloading surface and primary loading surface as described hereinabove and better illustrated in FIG. 8. The cylindrical slotted tubular spring element 620 is received within the accumulator 608 between the first and second loading cones 622, 624.

Downward compression of the dispensing head 604 causes a corresponding downward compression of the piston stem 616 and second loading cone 624, and elastic radial expansion of the slotted tubular spring element 620. Material within the accumulator chamber is pumped through a port 626 in the wall of the piston stem 616 into an interior stem passageway and upwardly into the dispensing head 604. As described above, release of the dispensing head 604 frees the spring element 620 to radially contract and create an upward axial force to return the piston stem 616 and dispensing head 604 back to their normal at rest positions.

Figure 32:
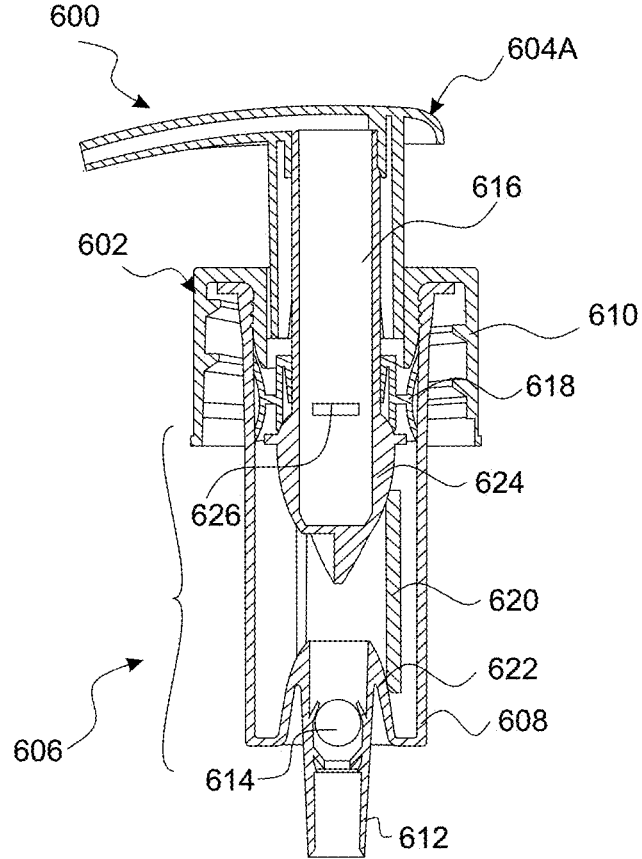

FIG. 32 illustrates a slightly modified embodiment 600A where the interior passage of the piston stem 616 is enlarged to improve material flow.

Figure 33:
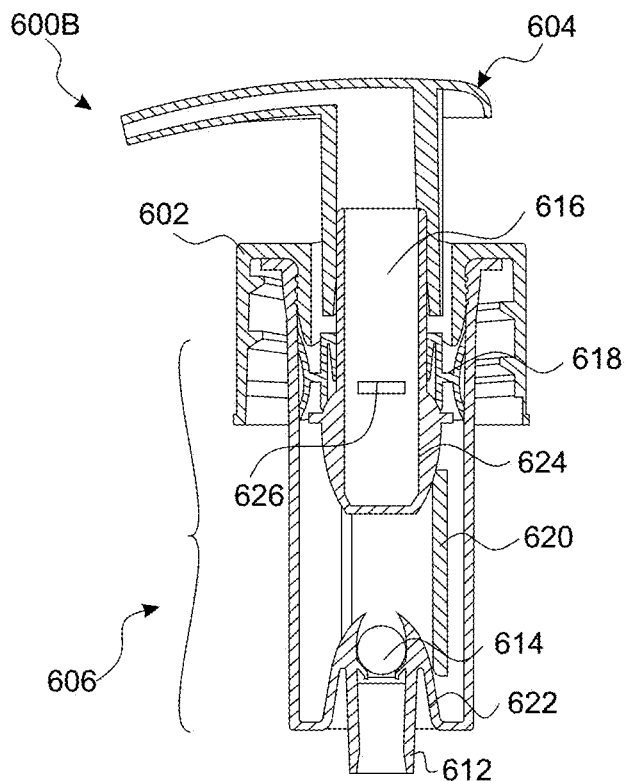

FIG. 33 illustrates another modified embodiment 600B where the tip of second loading cone 624 is truncated and the accumulator 608 is slightly shorter in length.

Figure 34:
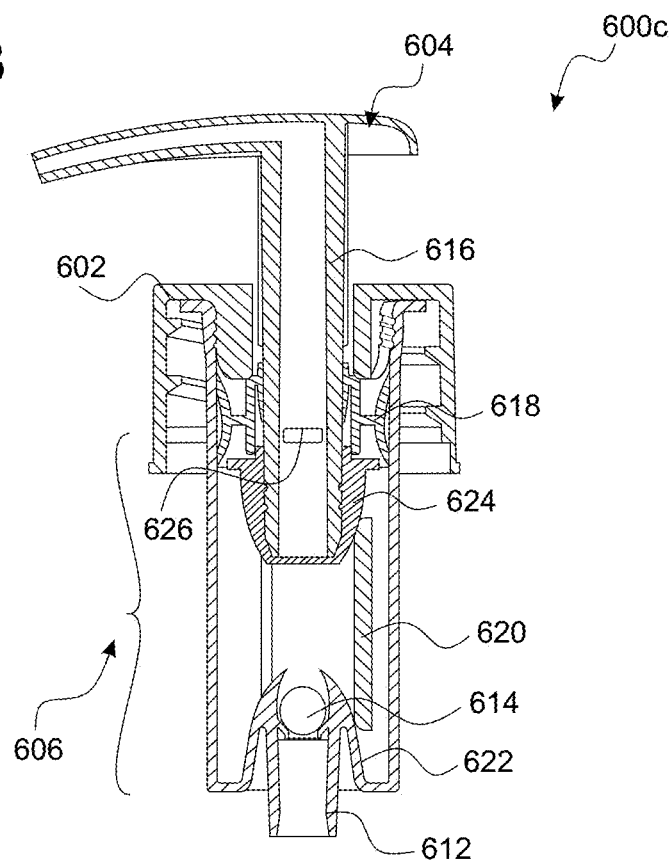
Figure 35:
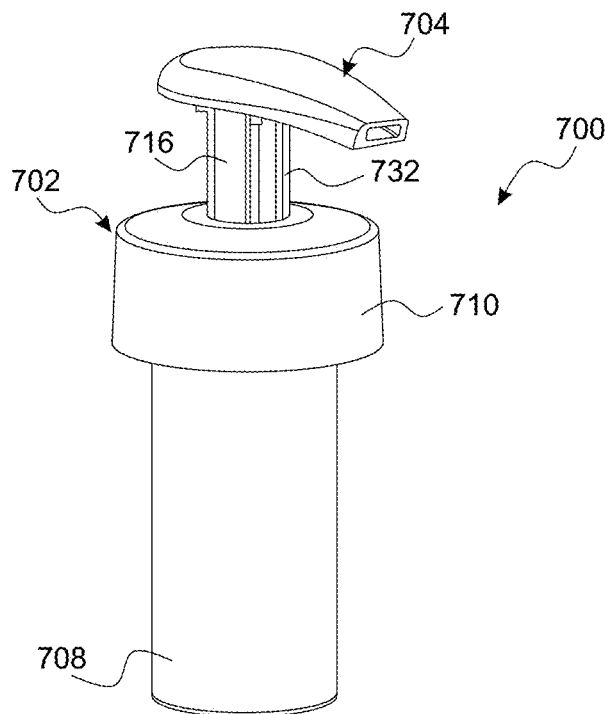
FIG. 35 is a perspective view of a preferred exemplary embodiment.
Figure 36:
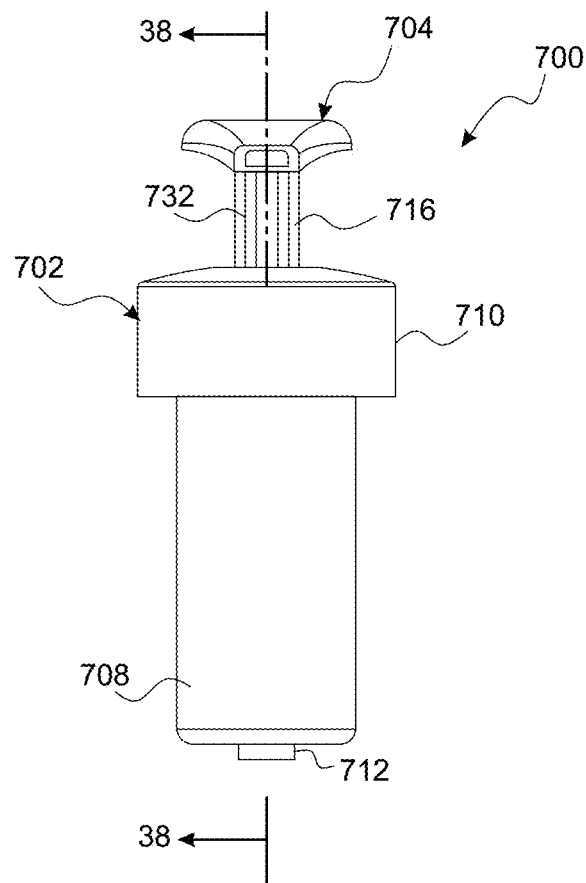
FIG. 36 is a front view thereof.

FIG. 34 illustrates yet another embodiment 600C where the second loading cone 624 is molded as a separate component and secured on a terminal end of the piston stem 616 below the piston seal 618.

Figure 37:
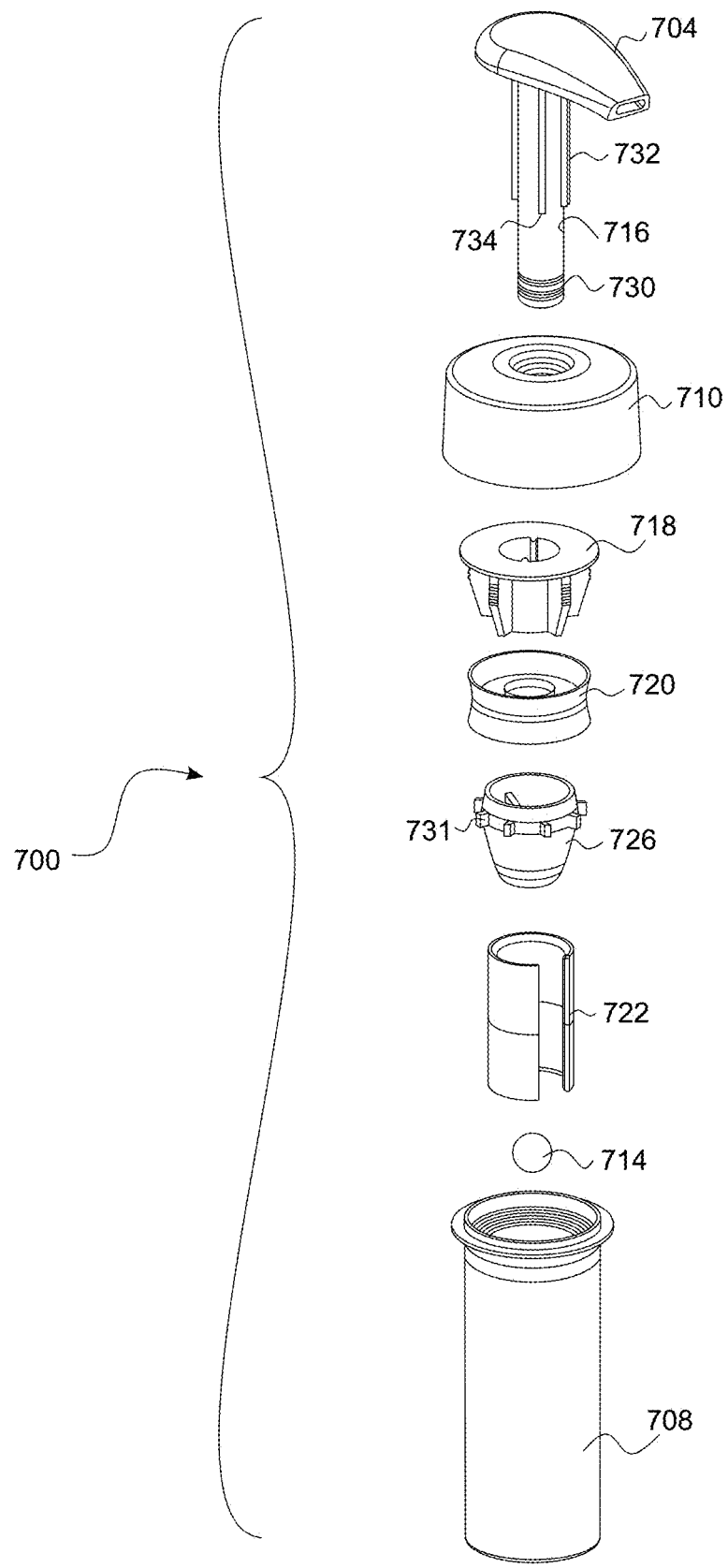
FIG. 37 is an exploded perspective view thereof.
Figure 38:
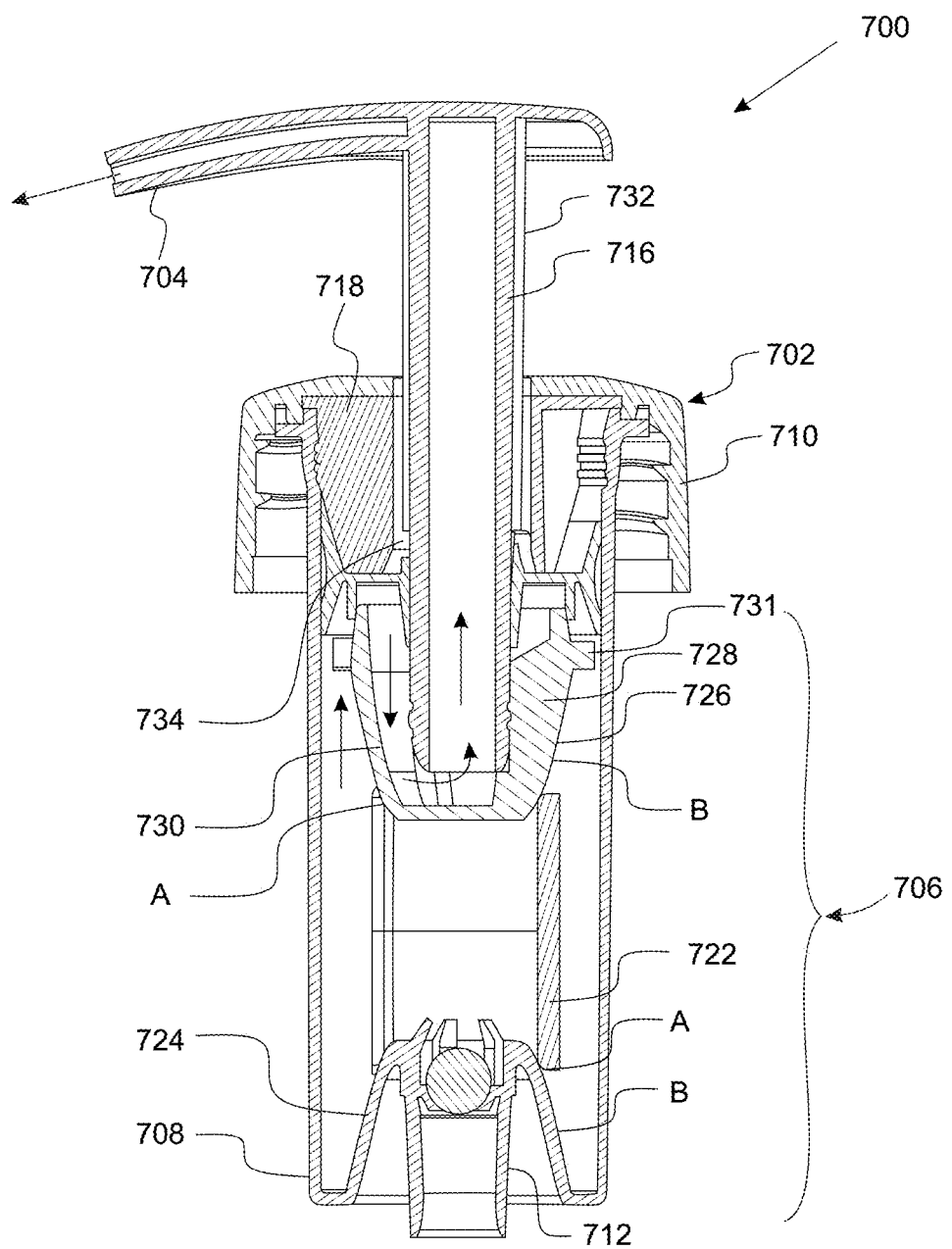
FIG. 38 is a cross-sectional view thereof taken along line 38-38 of FIG. 36.
Figure 41:
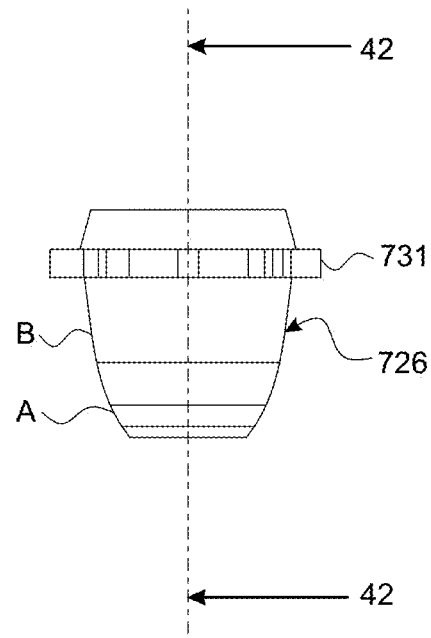
FIG. 41 is a plan view of the second loading cone.
Figure 42:
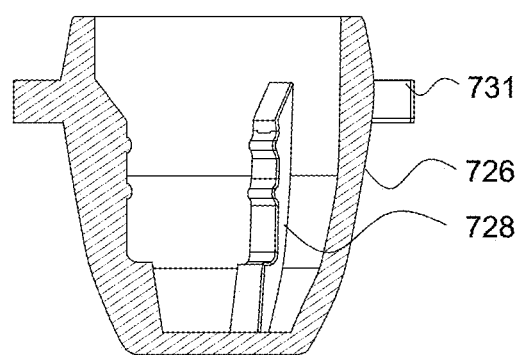
FIG. 42 is a cross-sectional view thereof taken along line 42-42 of FIG. 41.

Turning now to FIGS. 35-48, one exemplary embodiment of the dispensing pump is illustrated and generally indicated at 700. The dispensing pump 700 comprises a pump base assembly 702, a dispensing head 704 and a polymer compression spring assembly 706. The pump base assembly 702 includes an accumulator cup 708 that is secured within the neck of a container (not shown) with a closure ring 710. In the exemplary illustration, the closure ring 710 is threaded for attachment to a threaded container neck. Referring to FIGS. 38 and 40, the accumulator 708 has a dip tube inlet 712 formed in the bottom wall thereof and a ball valve 714 is located within the dip tube inlet 712. The dispensing head 704 is integrally formed at the top end of a piston stem 716 which extends through the closure ring 710 and into the accumulator 708. The piston stem 716 is guided axially within the accumulator 708 by an annular chaplet 718 which is threadably received within the top peripheral edge of the accumulator 708. A piston seal 720 (see FIGS. 37-38) is received on the piston stem 716 midway along the length thereof.

The compression spring assembly 706 is received within the accumulator 708, and comprises a cylindrical slotted tubular spring element 722 and first and second loading cones 724, 726. The first loading cone 724 of the present embodiment is integrally formed with the bottom wall of the accumulator 708 and extends upwardly around the clip tube inlet 712 and ball valve 714.

The second loading cone 726 is molded as a separate cup shaped component with an open top, a hollow interior and interior ribs 728 which are snap received onto corresponding ridges 730 the terminal end of the piston stem 716. The ribs 728 are formed such that the terminal end of the piston stem 716 is positioned slightly above the interior bottom wall of the loading cone 726 and such that a passage is provided from the interior of the loading cone 726 into the interior passage 729 of the piston stem 716 (see arrows in FIG. 38). It is noted here that the piston stem 716 extends coaxially through the piston seal 720 such that the piston seal 720 is located above the second loading cone 726. Further the exterior surface of the second loading cone 726 includes radially outward guides 731 which assist proper sliding movement of the loading cone 726 within the interior wall of the accumulator 708.

The loading cones 724, 726 have both the preloading surface A and primary loading surface B described hereinabove. The cylindrical slotted tubular spring element 722 is received within the accumulator 708 between the first and second loading cones 724, 726. While the exemplary embodiment herein is illustrated with a cylindrical tubular spring element 722 it should be understood that the spring element 722 may comprise any of the herein described spring elements. Likewise, the loading cones 724, 726 may be formed with any of the configurations described herein above.

Figure 43:
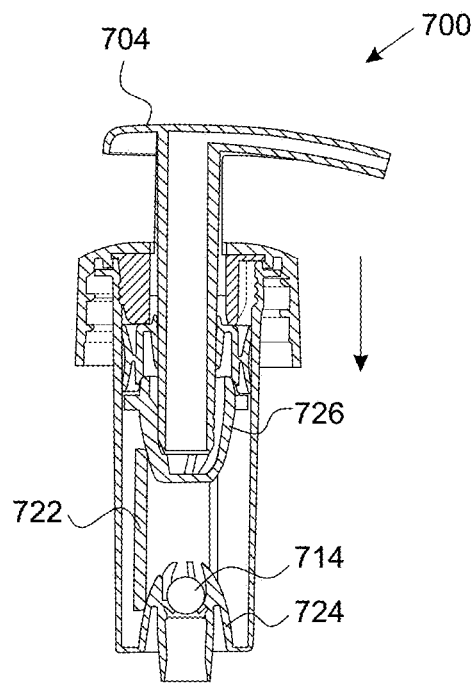
FIGS. 43-48 are cross-sectional views thereof showing a complete pump stroke sequence.
Figure 44:
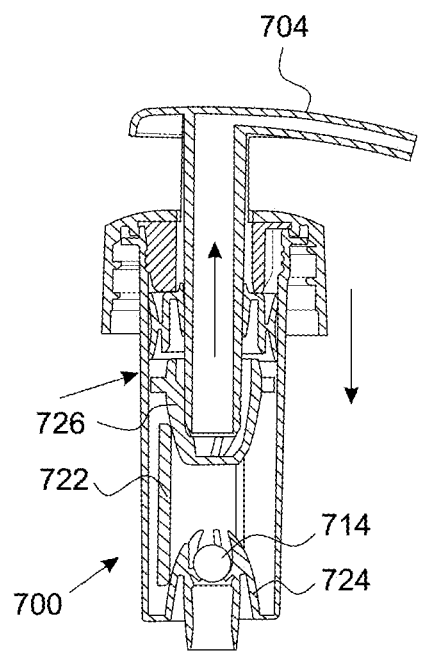
Figure 45:
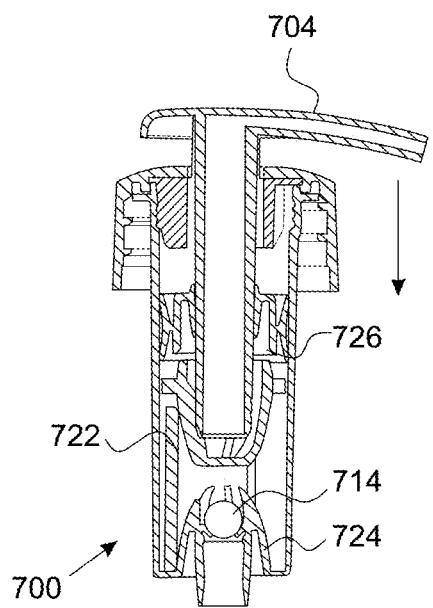
Figure 46:
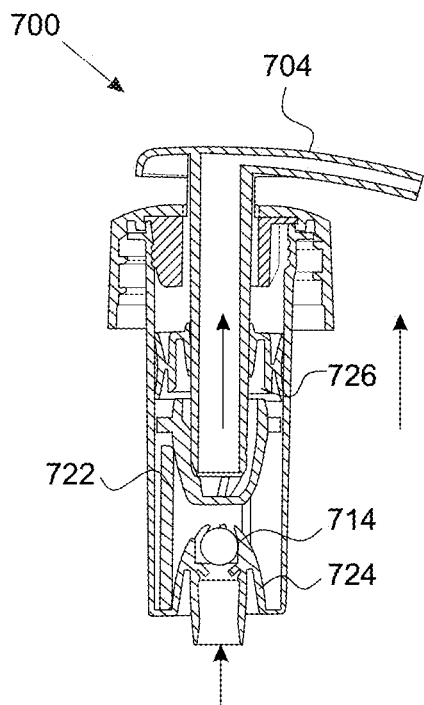
Figure 47:
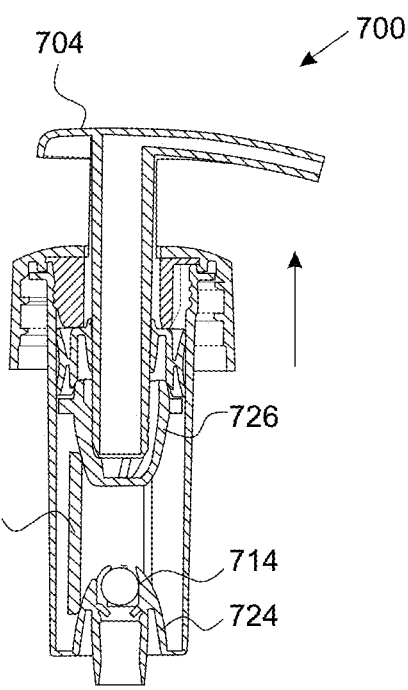
Figure 48:
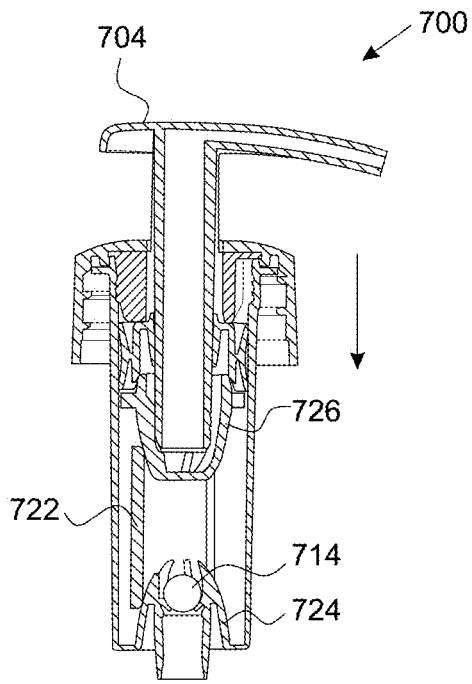
Figure 49:
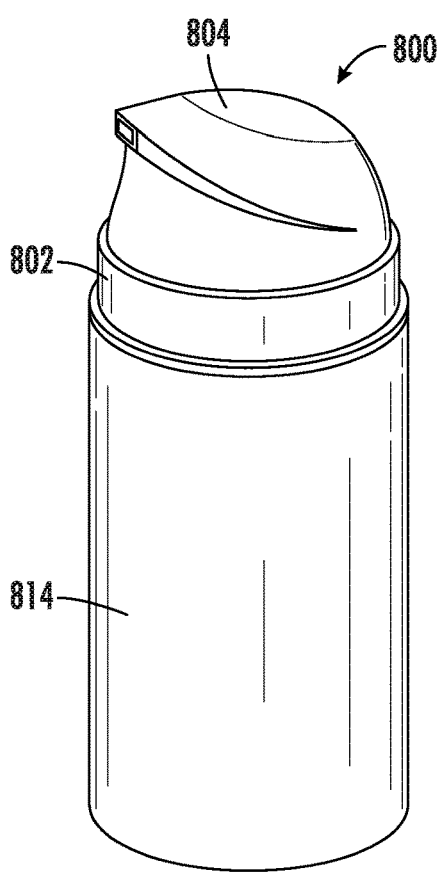
FIG. 49 is a perspective view of another exemplary embodiment.
Figure 50:
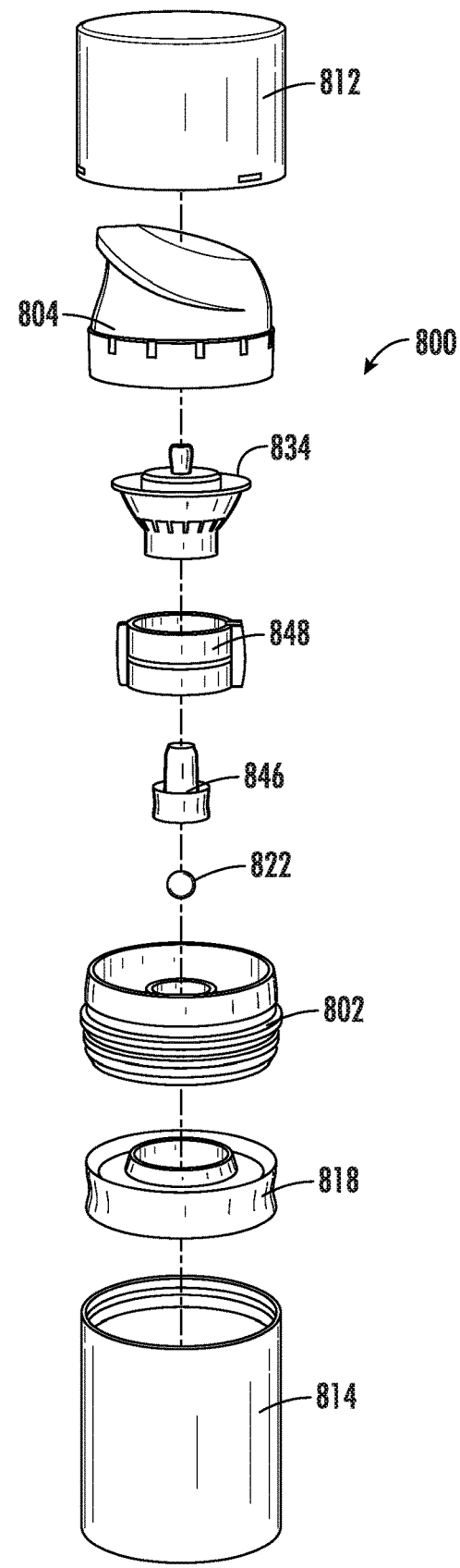
FIG. 50 is an exploded perspective view thereof.
Figure 52:
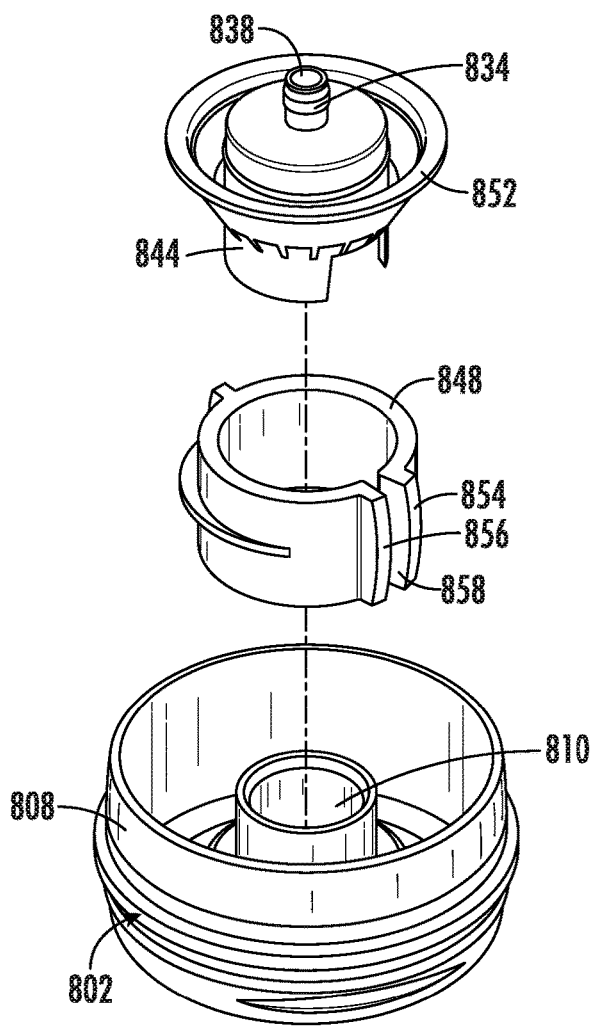
FIGS. 52 and 53 are perspective view of the compression spring assembly.
Figure 53:
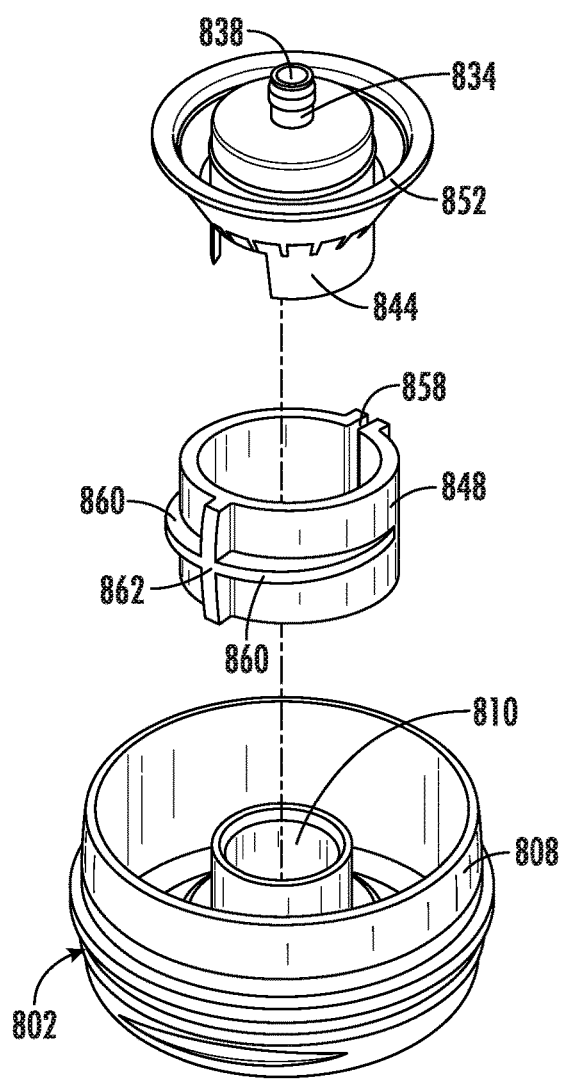
Figure 54:
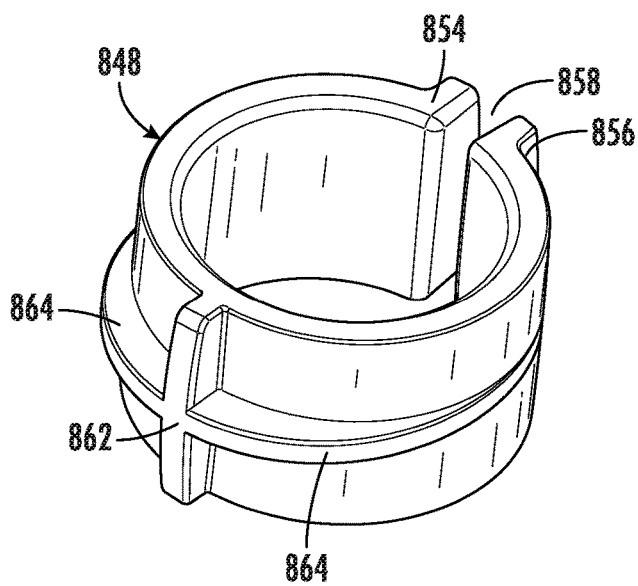
FIGS. 54-58 are various view of the spring element.
Figure 55:
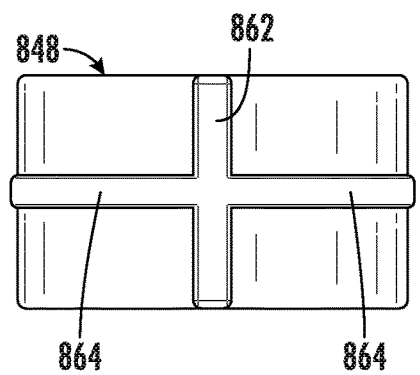
Figure 56:
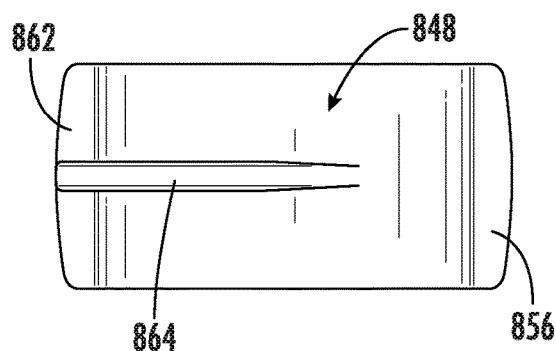
Figure 57:
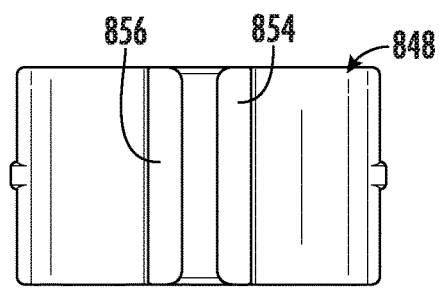

Turning to FIGS. 43-48 a complete dispensing sequence for the present embodiment 700 is illustrated. FIG. 43 illustrates a starting position with the loading cones 724 slightly pre-loaded and the ball valve 714 closing the dip tube inlet port 712. During assembly, the chaplet 718 threads down into the top of the accumulator 708 and compresses the various components together in a slightly pre-loaded condition. Moving to FIG. 44, downward compression of the dispensing head 704 and piston stem 716 causes a corresponding downward compression of the second loading cone 726, the start of elastic radial expansion of the slotted tubular spring element 722, and opening of a dispensing passage between the bottom of the piston seal 720 and the top edge of the second loading cone 726. In FIG. 45, further downward compression of the dispensing head 704 moves both the loading cone 726 and the piston seal 720 providing pumping action. A set of circumferentially spaced guide ribs 732 extending longitudinally down the exterior wall of the piston stem 716 have terminal shoulders 734 which engage the center ring of the piston seal 720 and cause corresponding downward movement thereof along with the dispensing head 704. Material within the accumulator 708 is forced down into the interior of the second loading cone 726, upward into the interior stem passageway 729 and upwardly into the dispensing head 704. Turning to FIGS. 46-48, release of the dispensing head 704 frees the spring element 722 to radially contract and create an upward axial force to return the piston stem 716, piston seal 720 and dispensing head 704 back to their normal at rest positions. In returning to the start position, the ball valve 714 is opened (FIG. 46) to draw fresh material from the container into the accumulator 708 (FIG. 47). At completion of the pump stroke, the ball valve 714 re-seats itself to close the dip tube inlet 712.

Turning now to FIGS. 49-64, another exemplary embodiment of a dispensing pump is illustrated and generally indicated at 800. The dispensing pump 800 comprises a pump base 802, a dispensing head 804 and a polymer compression spring assembly 806. The pump base 802 includes an outer skirt wall 808 and an inner accumulator cup 810. A lower portion of the outer surface of the skirt wall 808 is snap received within the neck 812 of a container or jar 814. In the exemplary illustration, the skirt wall 808 and neck 812 include interfitting ridges for a snap fit attachment to the container 814. A cup-shaped cap 816 is snap received over the dispensing head 804 onto ridges on an upper portion of the outer surface of the skirt wall 808.

The exemplary embodiment 800 as disclosed is an airless pump system and as such, includes a piston follower 818 received within the container 814 which seals against the inner wall of the container 814.

Referring to FIGS. 51 and 59-64, the accumulator cup 810 has an inlet port 820 formed in the bottom wall thereof and a ball valve 822 is located within the inlet port 820.

The dispensing head 804 has an integrally formed outlet nozzle 824 with an outer shroud wall 826 and a downwardly extending inlet stem 828. The outer shroud wall 826 has a lower peripheral edge portion which is received within the skirt wall 808 of the pump base 802. The peripheral edge portion includes a raised ridge 830 which interacts with a corresponding shoulder 832 extending inwardly at the upper peripheral edge of the skirt wall 808. The ridge 830 and shoulder 832 interact to maintain the dispensing head 804 and pump base 802 in assembled relation and define an at-rest stop position (FIG. 59) of the pump assembly 800.

A piston stem 834 has an interior flow passage 836, an upper end 838 which is assembled with the inlet stem 828 of the dispensing head 804 and an opposed lower end 840 which extends downwardly into the accumulator 810. The lower end 840 also has an inlet opening 842. The piston stem 834 is guided axially within the accumulator 810 by means of an annular guide wall 844 which is concentrically received around the outside of the accumulator 810. A piston seal 846 is received on the lower end 840 of the piston stem 834, sealing against the inner walls of the accumulator 810 and also sealing the inlet opening 842.

The compression spring assembly 806 is situated in the space between the outer skirt wall 808 and the outside of the accumulator 810 and comprises a cylindrical slotted tubular spring element 848 and first and second loading cones 850, 852. The first loading cone 850 of the present embodiment is integrally formed with the bottom wall of the pump base 802 and extends upwardly concentrically around the outside of the accumulator 810. The second loading cone 852 is disposed concentrically around the piston stem 834, and in the exemplary embodiment is molded as an integral portion of the guide wall 844 of the piston stem 834. The second loading cone 852 moves with the dispensing head 804 and piston stem 834 during the dispensing cycle. The loading cones 850, 852 may have both a preloading surface and primary loading surface described hereinabove.

Figure 58:
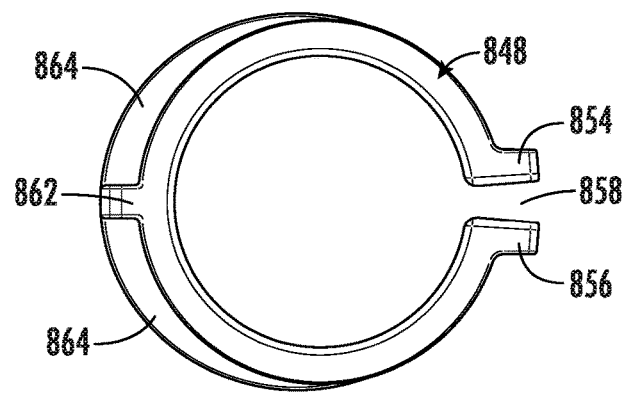

The spring element 848 is generally cylindrical in shape as above, and may have strain reducing ribs 854, 856 extending along the opposing edges of the longitudinal slot 858. The spring element 848 may also include a strengthening/relief rib 860 extending circumferentially around the outer wall of spring 844 and another spine rib 862 extending longitudinally along the height of the spring 848 opposite the slot 858. Referring to FIG. 58, the present embodiment includes a longitudinal rib 862 that extends outwardly opposing the slot essentially forming a longitudinal spine of the spring. The circumferential rib(s) 860 extend circumferentially around the spring element 848 from the longitudinal spine 862 toward the slot 858, gradually reducing in height until merging with the outer surface of the spring wall slightly more than 90 degrees from the longitudinal back spine 862. Any, or all, of these ribs 854, 856, 860, 862 may provide additional strength, resilience, strain relief and spring force in shorter height spring elements.

While the exemplary embodiment herein is illustrated with a cylindrical tubular spring element 848 it should be understood that the spring element may comprise any of the herein described spring elements. Likewise, the loading cones 850, 852 may be formed with any of the configurations described herein above.

Figure 59:
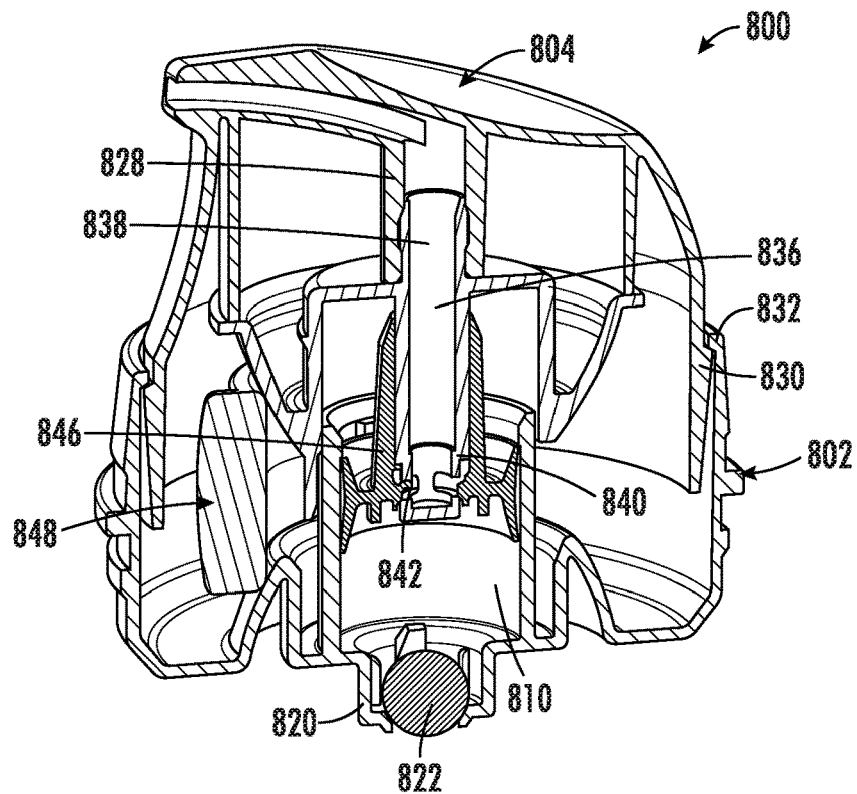
FIGS. 59-64 are cross-sectional views thereof showing a complete actuation cycle and motion of the dispenser head and spring.
Figure 60:
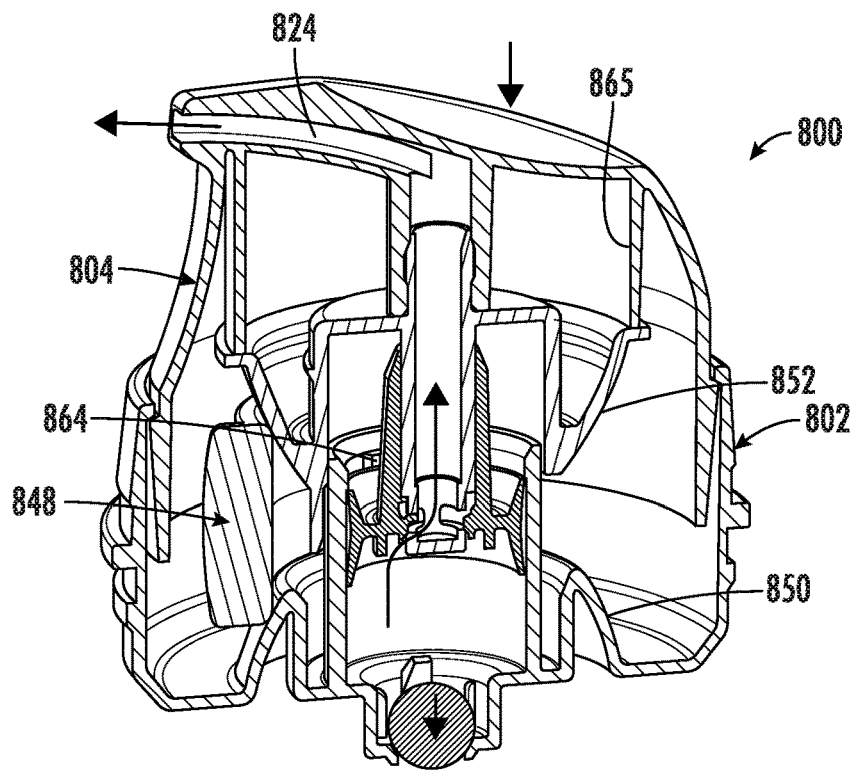
Figure 61:
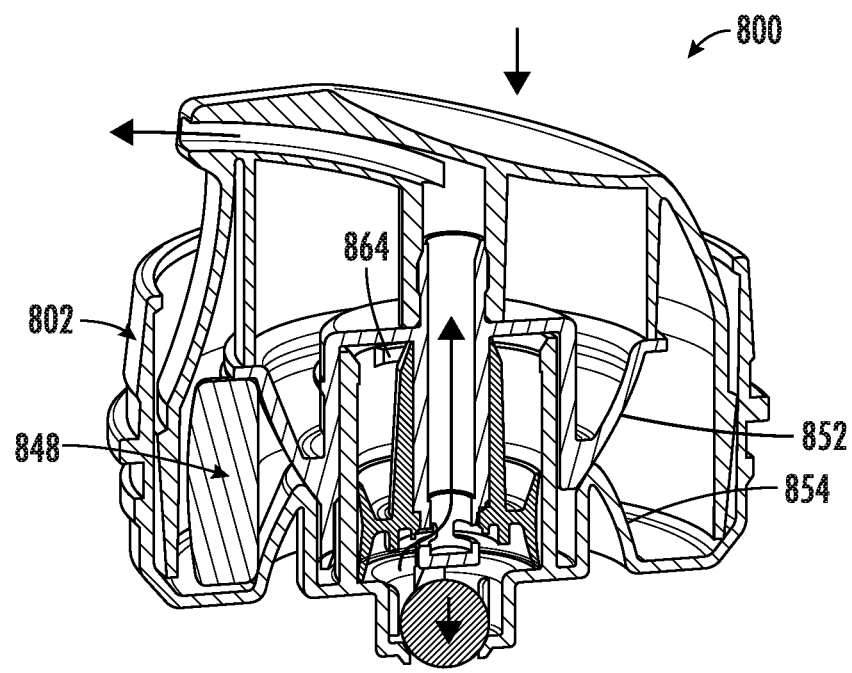
Figure 62:
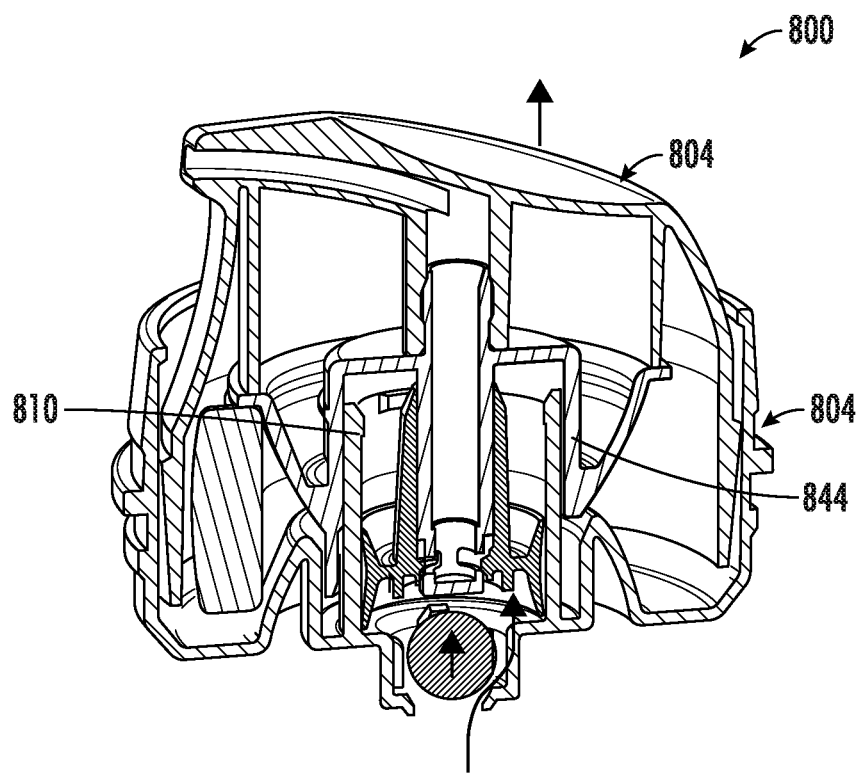
Figure 63:
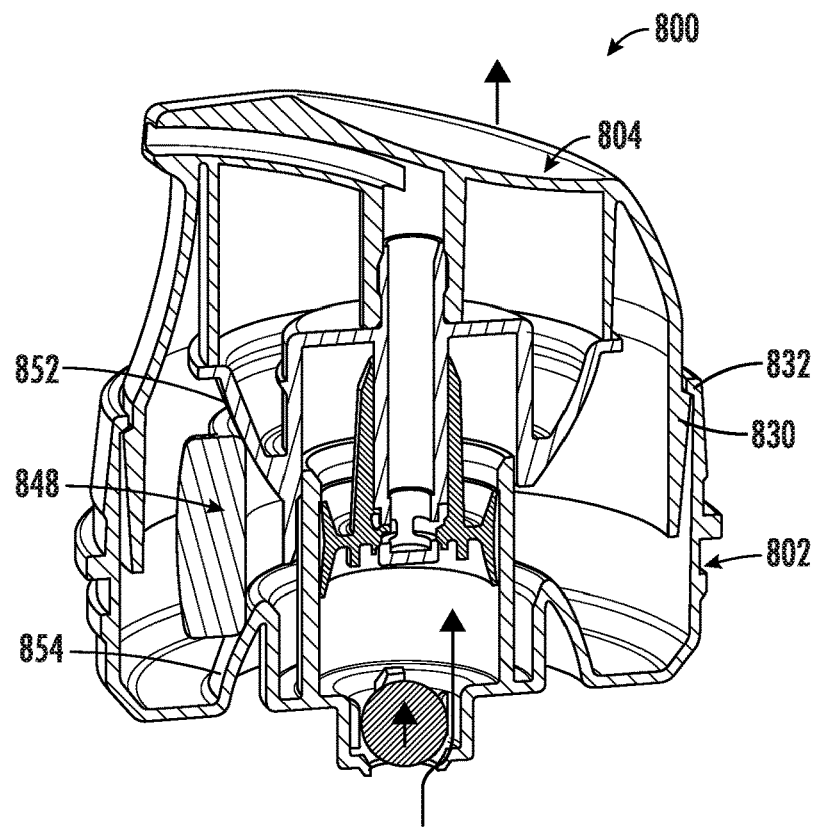
Figure 64:
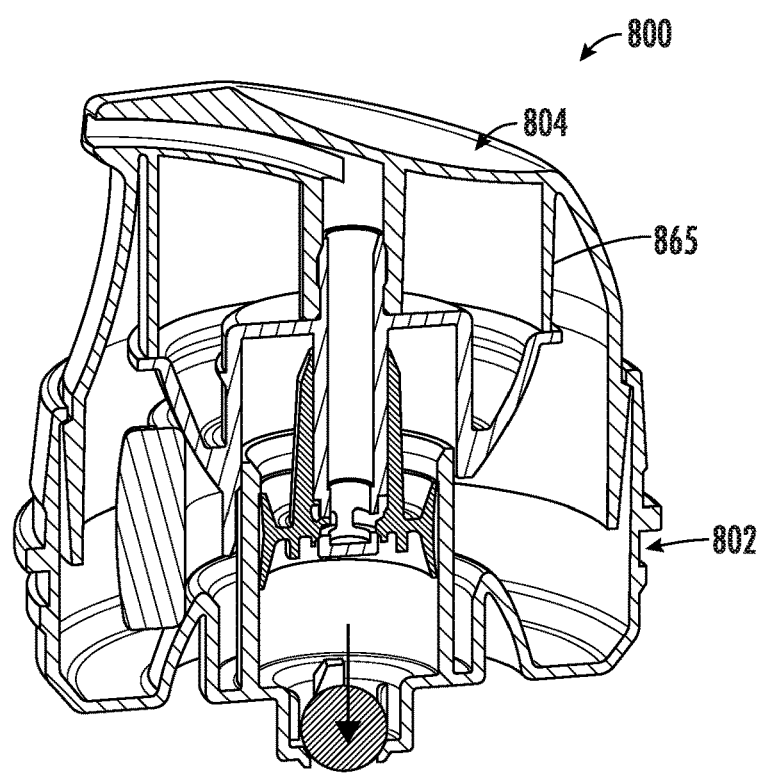
Figure 65:
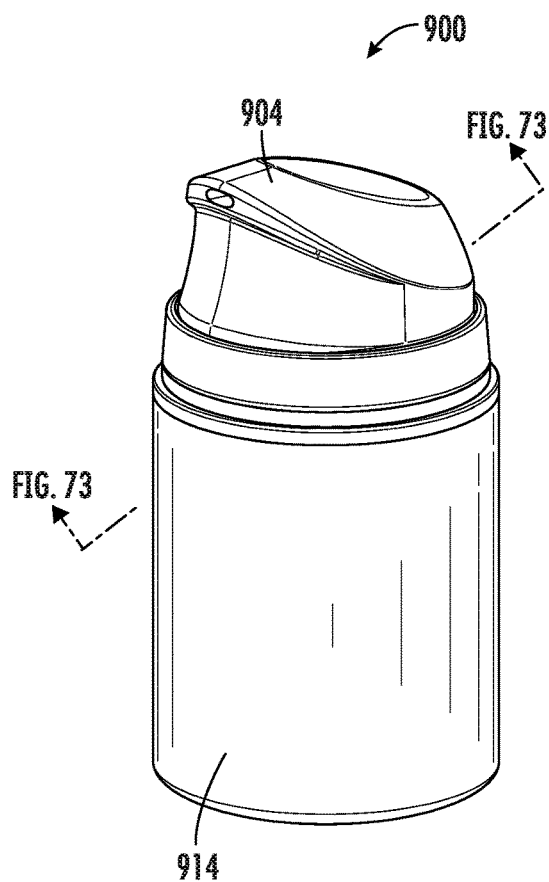
FIG. 65 is a perspective view of still another exemplary embodiment including a flow baffle and base vents.
Figure 66:
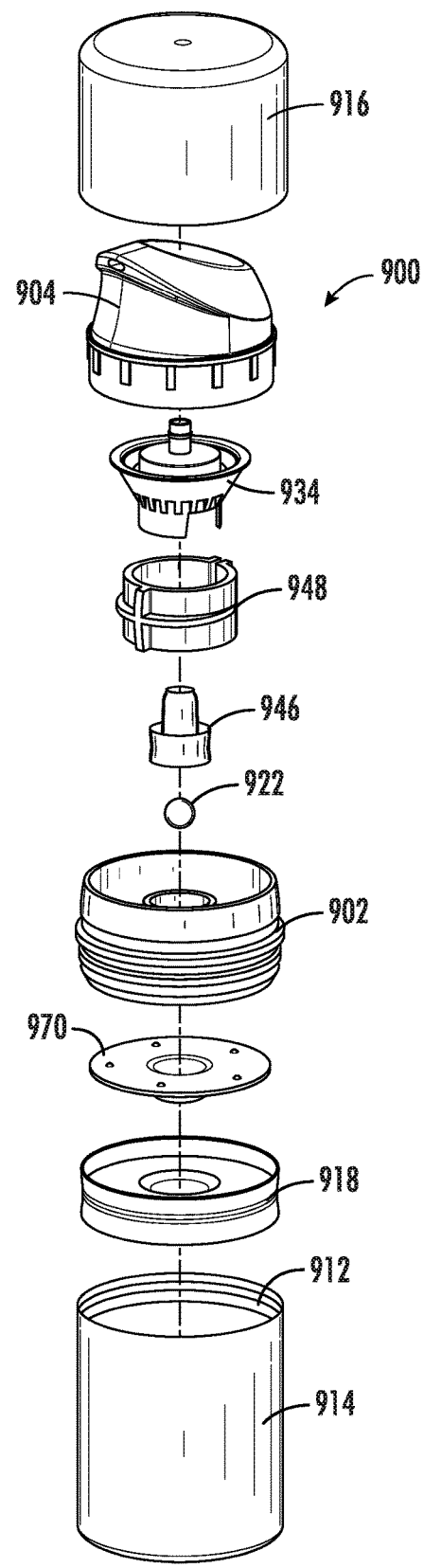
FIG. 66 is an exploded perspective view thereof.
Figure 67:
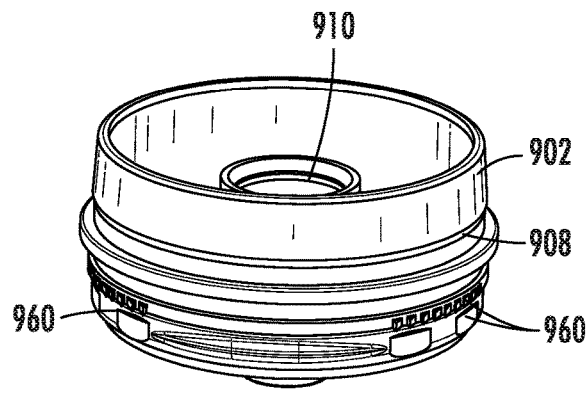
FIGS. 67-69 are various views of the cap base.
Figure 68:
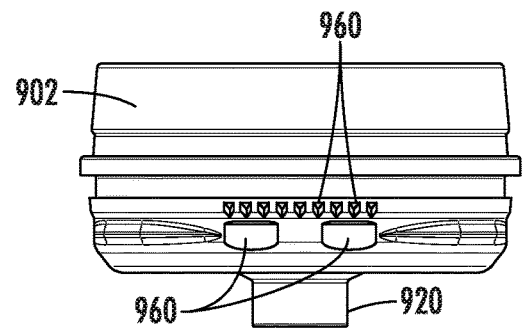
Figure 69:
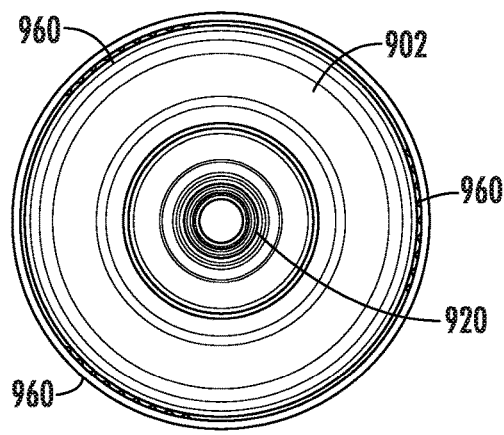
Figure 70:
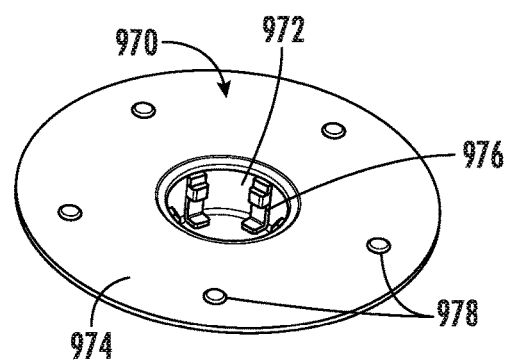
FIGS. 70 and 71 are various views of the flow baffle.
Figure 71:
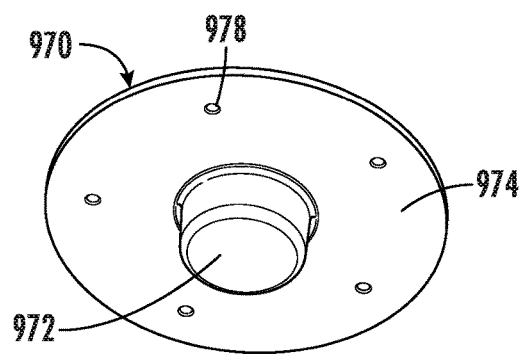
Figure 72:
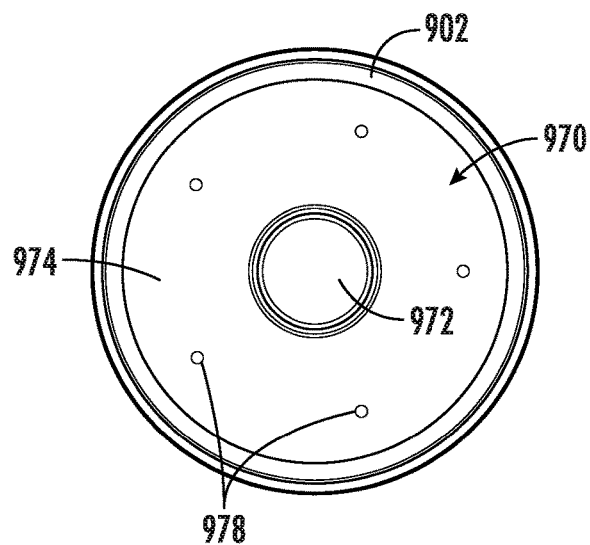
FIG. 72 is a bottom view of the dispensing head with the flow baffle assembled.

Turning to FIGS. 59-64, a complete dispensing sequence for the present embodiment 800 is illustrated. FIG. 59 illustrates a starting position with the loading cones 850, 852 and spring 848 slightly pre-loaded, the piston seal 846 captured against a bead 864 on the inside peripheral edge of the accumulator cup 810, the lower end 840 of the piston stem 834 seated in the piston seal 846, and the ball valve 822 closing the inlet port 820. Moving to FIG. 60, downward compression of the dispensing head 804 and piston stem 834 causes downward compression of the second loading cone 852, the start of elastic radial expansion of the slotted tubular spring element 848, and opening of a dispensing passage (842) in the bottom end 840 of the piston stem 834 which slides relative to the piston seal 846. Movement of the upper loading cone 852 is stabilized by the guide walls 844 and further by an annular wall 865 which extends downwardly from the dispensing head 804. The annular wall 865 engages the outer periphery of the loading cone 852 to provide a uniform downward compression. In FIG. 61, further downward compression of the dispensing head 804 moves both the loading cone 852 and the piston seal 846 providing pumping action. The ball valve 822 remains seated in the valve seat within the inlet port 820. Material within the accumulator 810 is forced into the interior passage 836 of the piston stem 834, upward into the inlet stem 828 and upwardly into the nozzle 824. Turning to FIGS. 62-64, release of the dispensing head 804 frees the spring element 848 to radially contract and create an upward axial force to return the piston stem 834, piston seal 846 and dispensing head 804 back to their normal at rest positions (FIGS. 59 and 64). In returning to the start position, the piston inlet passage 842 is closed and the ball valve 822 is opened (FIG. 62) to draw fresh material from the container 814 into the accumulator 810 (FIG. 63) through the inlet port 820. At completion of the return stroke, the ball valve 822 re-seats itself to close the inlet port 820 (FIG. 64).

Turning now to FIGS. 65-74, another exemplary embodiment of a dispensing pump is illustrated and generally indicated at 900. The dispensing pump 900 is substantially similar to the above-described embodiment 800 in structure and function with two exceptions. The pump 900 may additionally include venting structures 960 on the outer peripheral surfaces of the pump base 902 as well as a baffle structure 970 which is disposed over the inlet port 920 into the pump base 902, the purposes of which will be described hereinbelow.

The major working components of dispensing pump 900 are essentially the same. The dispensing pump 900 comprises a pump base 902, a dispensing head 904 and a polymer compression spring assembly 906. The pump base 902 includes an outer skirt wall 908 and an inner accumulator cup 910. A lower portion of the outer surface of the skirt wall 908 is snap received within the neck 912 of a container or jar 914. A cup-shaped cap 916 is snap received over the dispensing head 904. The exemplary embodiment 900 also further includes a piston follower 918. As similarly descried above, the accumulator cup 910 has an inlet port 920 formed in the bottom wall thereof and a ball valve 922 is located within the inlet port 920.

A piston stem 934 and piston seal 946 are assembled with the dispensing head 904 as also described above.

The compression spring assembly 906 is the same as described hereinabove comprising a cylindrical slotted tubular spring element 948 and first and second loading cones integrally formed with the pump base 902 and the piston stem 934.

Turing to the present improvements, it has been found that in some cases, the inlet port 920 dips down into product within the container 914 when the container 914 is first filled and capped. With self-leveling products this is not an issue. However, with non-self-leveling products, the pump 900 will start to produce an output before air trapped in the headspace between the pump base and the product in the container has been evacuated. This issue causes variation in the output of each pump stroke. In this regard, the pump base 902 is provided with a plurality of peripheral vents 960 or relief areas on the outer surface of the pump base skirt 908. During capping of the pump base 902 onto the container neck 912, the vents 960 allow air to escape as the pump base 902 is seated down within neck 912. The vents 960 prevent too much air from becoming trapped in the headspace when capping and less air reduces the number of priming strokes before product is dispensed. The vents 960 may be grouped together (See FIG. 68) and may also be circumferentially spaced around the peripheral edge of the pump base 902 (See FIGS. 67-69). Additionally, the vents 960 may have tiered sizes from larger vents to smaller vents in the direction of air flow escaping the headspace (See FIG. 68).

Figure 73:
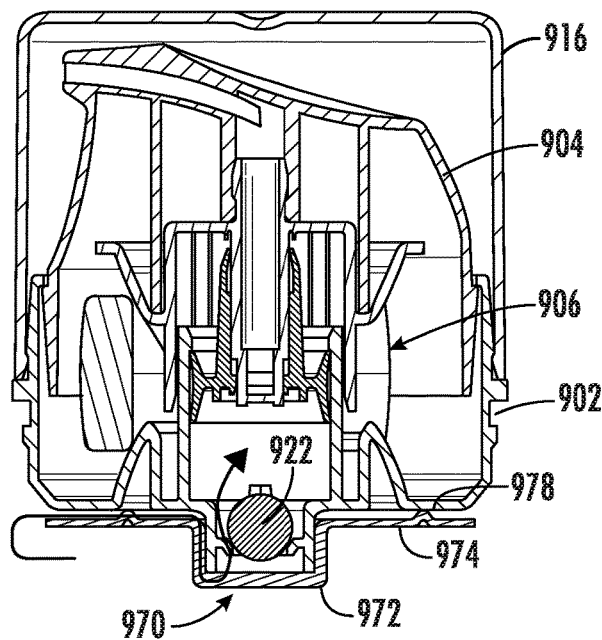
FIG. 73 is a cross-sectional view of the dispensing head taken along line 73-73 of FIG. 65
Figure 74:
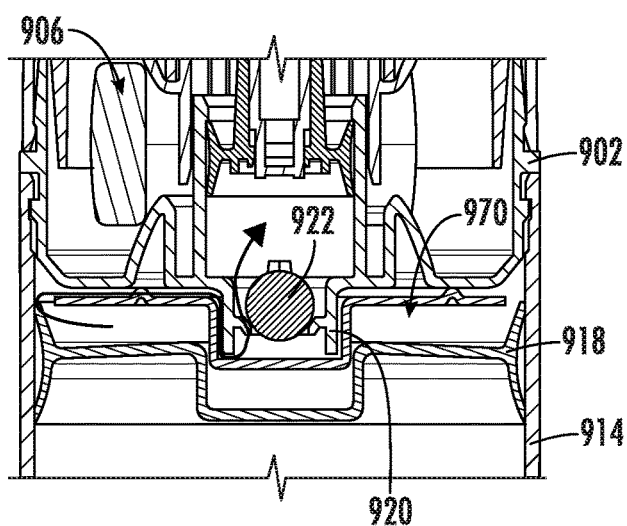
FIG. 74 is another cross-section view thereof also showing the container and piston follower.
Figure 77:
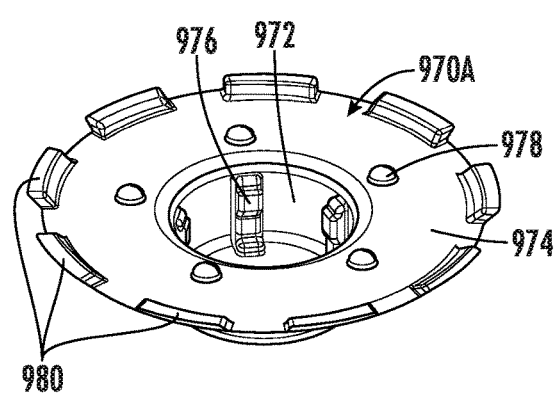
FIGS. 77-78 are various views of the flow baffle.
Figure 78:
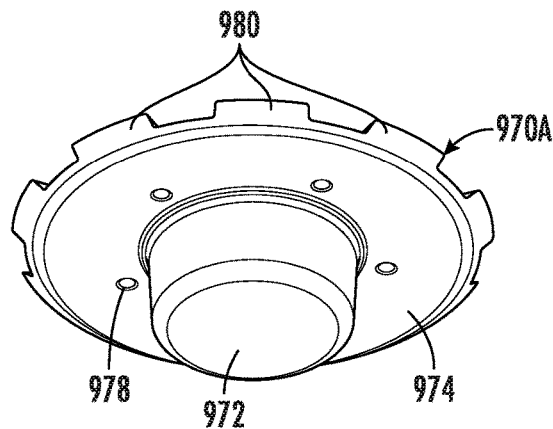
Figure 79:
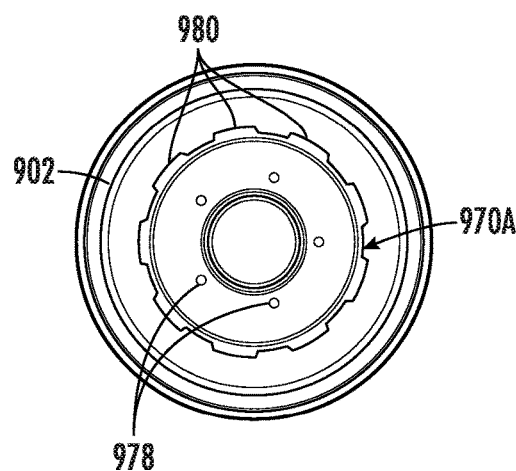
FIG. 79 is a bottom view of the dispensing head with the flow baffle assembled.

The flow baffle 970 includes a central nipple portion 972 and a radially outward extending flange portion 974 which extends parallel to the bottom surface of the pump base 902 (See FIG. 73). The interior recessed surfaces of the nipple portion 972 include standoffs 976 which are snap received onto the outside surface of the inlet port 920 maintaining a flow channel therebetween (See FIGS. 73-74). The upper surface of the flange portion 974 includes a plurality of upwardly extending detents 978 which maintain spacing between the flange portion 974 and the bottom surface of the pump base 902 and maintain a flow channel to the inlet port 920. FIG. 74 best illustrates the flow path of product from the container 914 around the baffle 970 and into the inlet port 920. The added baffle 970 covers the inlet port 920 and prevents product from directly entering the inlet port 920 and being pulled into the accumulator 910 before the headspace air has been evacuated during priming strokes. The combination of the vents 960 and baffle 970 reduces the variation in output volume and reduces the number of strokes to prime the pump 900 making for a better customer experience.

Figure 80:
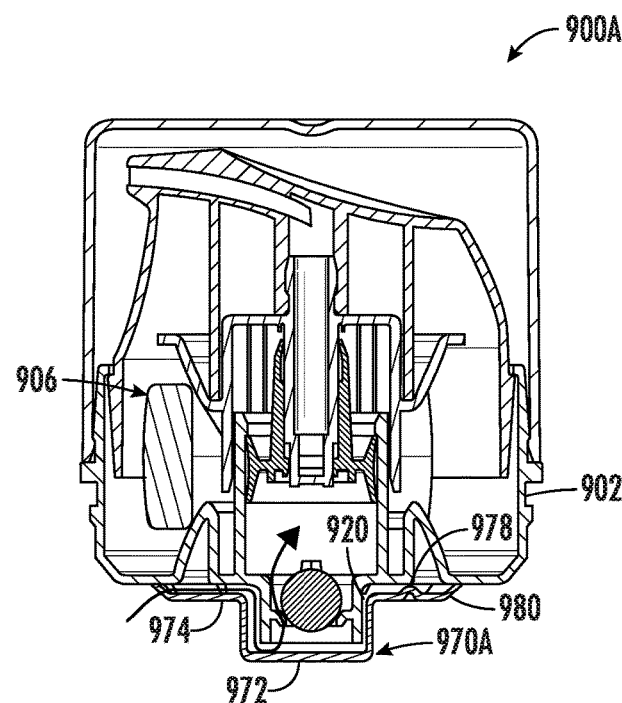
FIG. 80 is a cross-sectional view of the dispensing head taken along line 80-80 of FIG. 75.
Figures 81, 82:
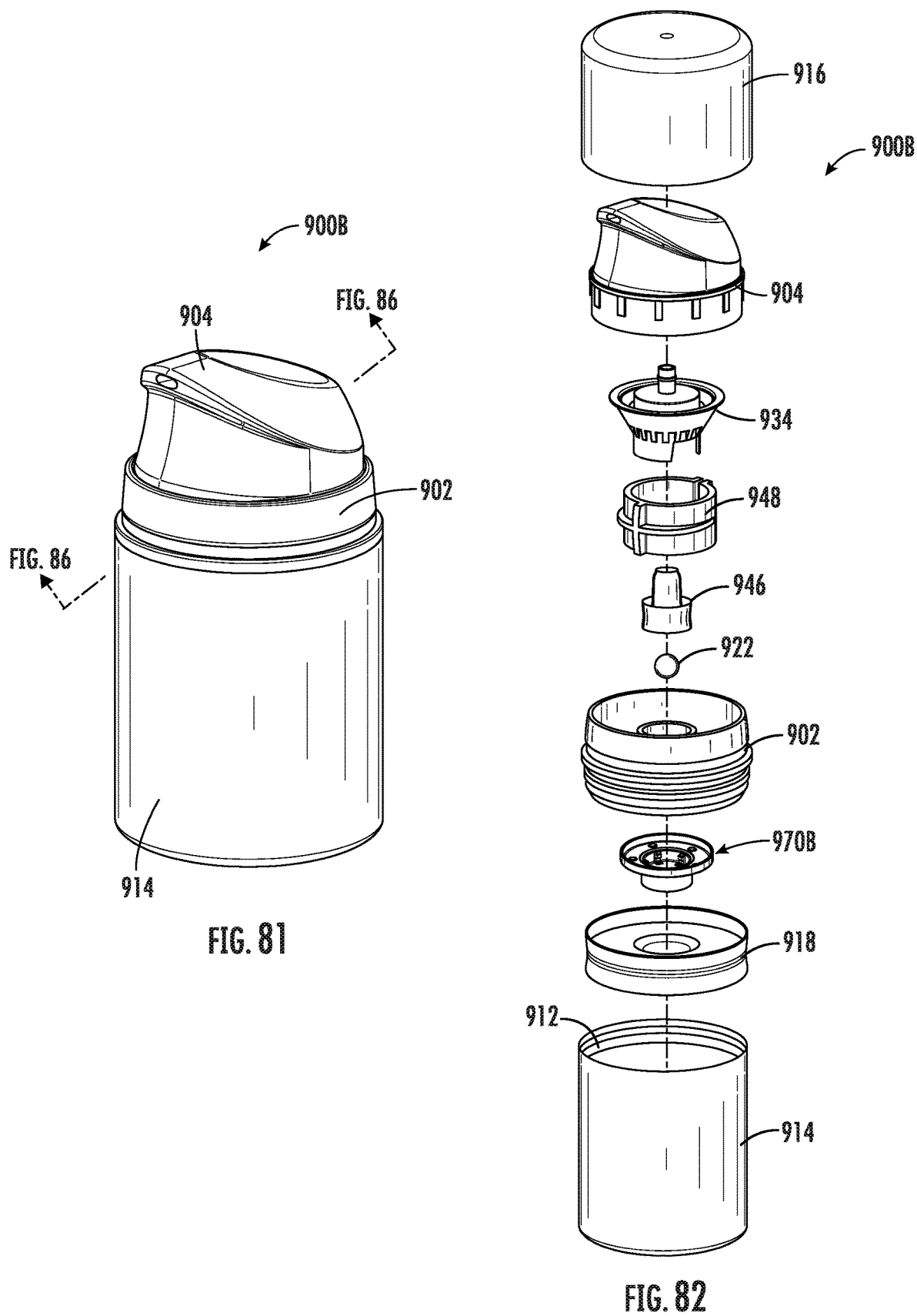
FIG. 81 is a perspective view of a further exemplary embodiment.
FIG. 82 is an exploded perspective view thereof.
Figure 83:
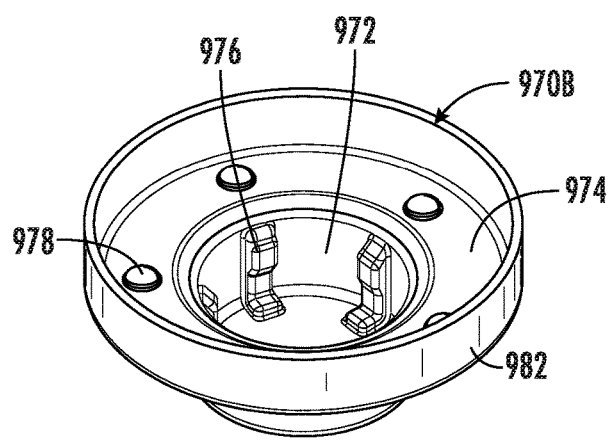
FIGS. 83-84 are various views of the flow baffle.
Figure 84:
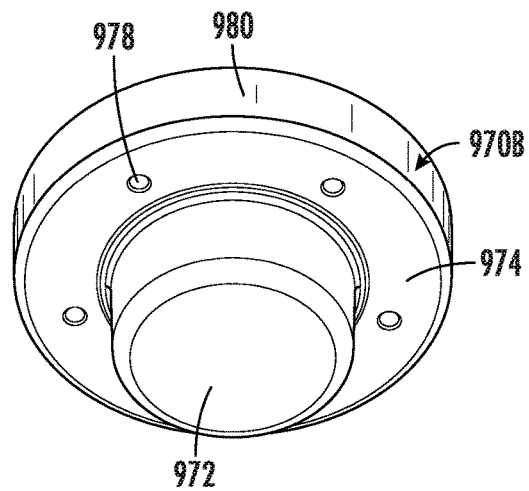
Figure 85:
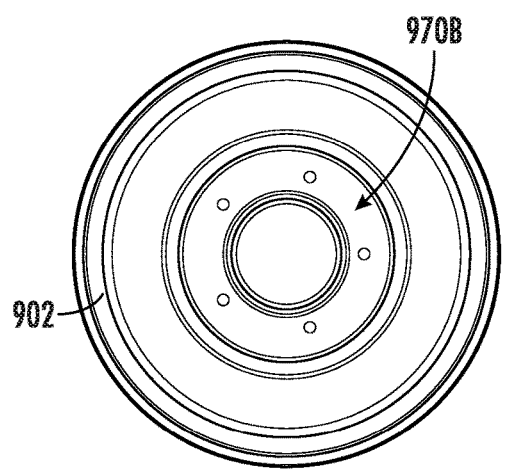
FIG. 85 is a bottom view of the dispensing head with the flow baffle assembled.

Turing to FIGS. 75-80, a variation of the dispensing pump 900 is indicated at 900A. The dispensing pump 900A may in all aspects be identical to the embodiment 900 with the same components except the baffle 970A which is best seen in FIGS. 77-80. The baffle 970A includes a central nipple portion 972 with standoffs 976 and a modified flange portion 974A. The flange portion 974A is slightly shorter in radial length and includes a plurality of circumferentially spaced fingers 980 which extend outwardly and upwardly from the outer peripheral edge of the flange portion 974A. The fingers 980 cooperate with the previously described detents 978 to maintain a flow channel between the baffle 970A and the pump base 902. FIG. 80 best illustrates the flow path of product from the container 914 around the baffle 970A and into the inlet port 920.

Figure 86:
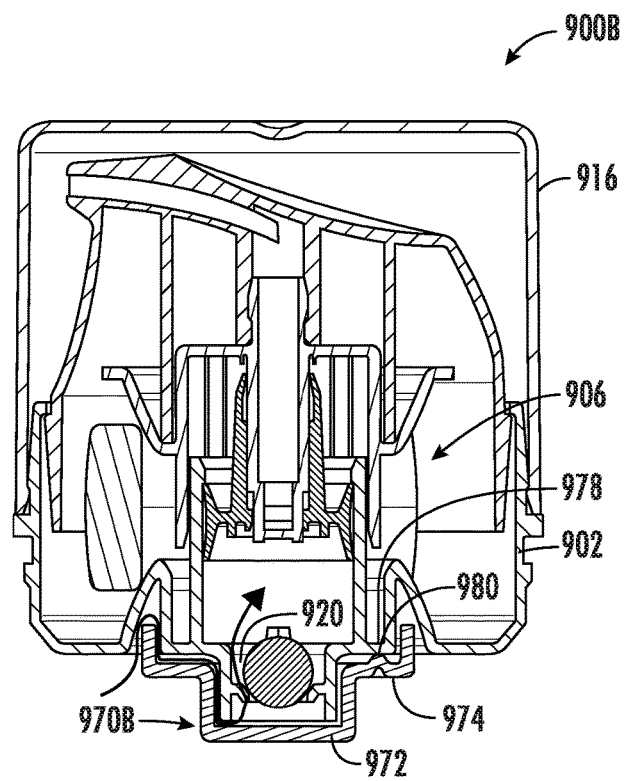
FIG. 86 is a cross-sectional view of the dispensing head taken along line 86-86 of FIG. 81.
Figures 87, 88:
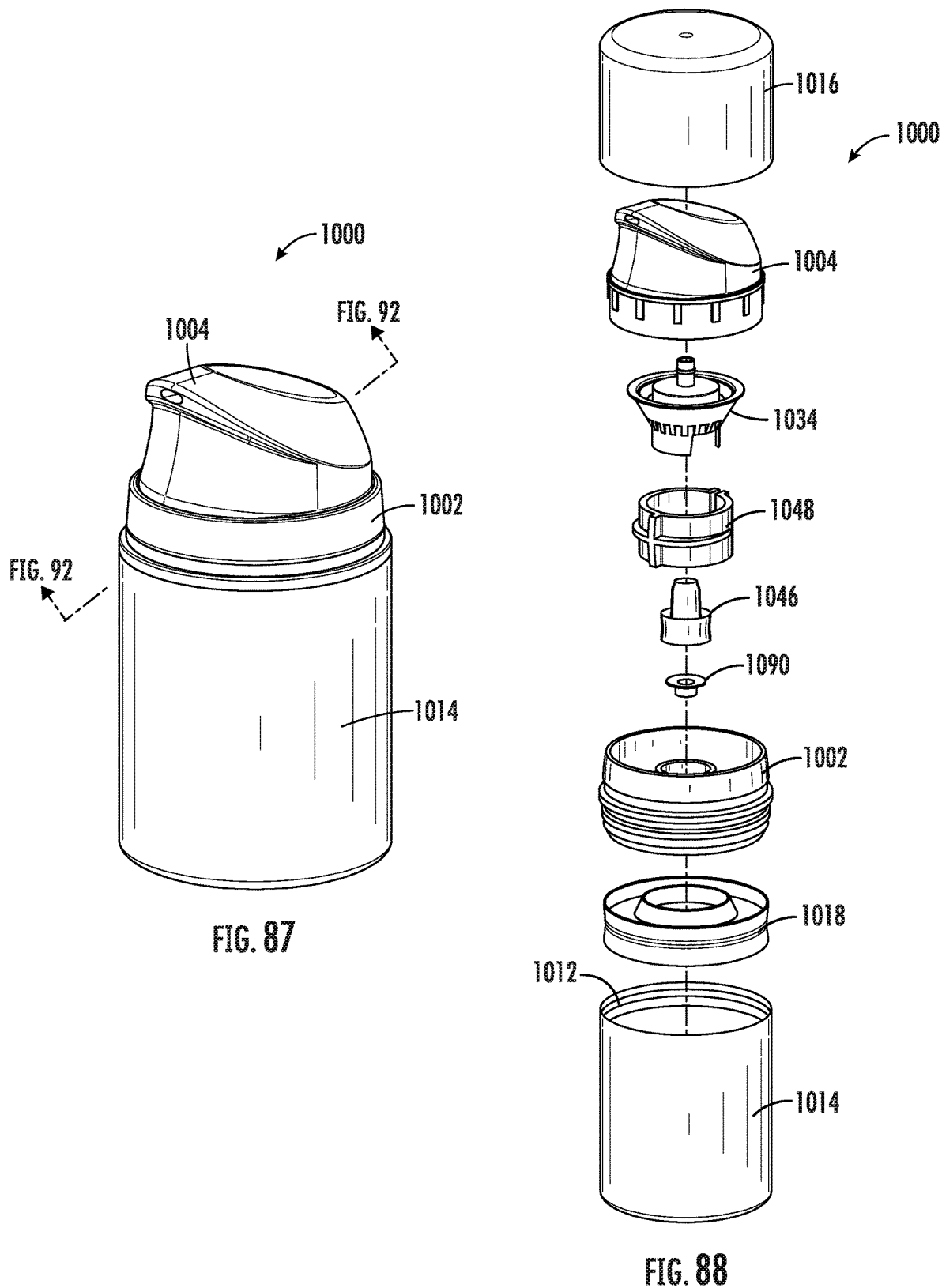
FIG. 87 is a perspective view of another exemplary embodiment including base vents and an alternative inlet port and flat valve.
FIG. 88 is an exploded perspective view thereof.
Figure 89:
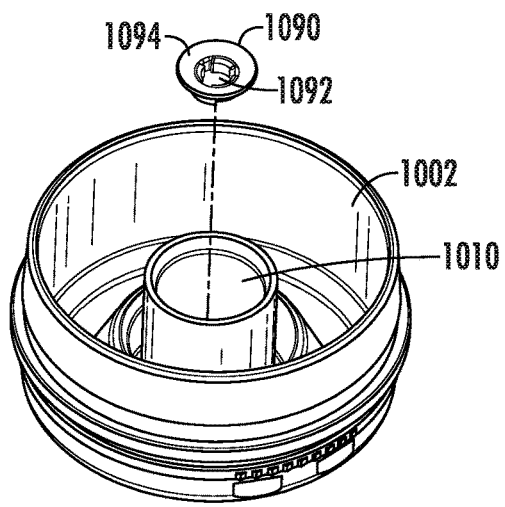
FIGS. 89-91 are various views of the pump base and disc valve.
Figure 90:
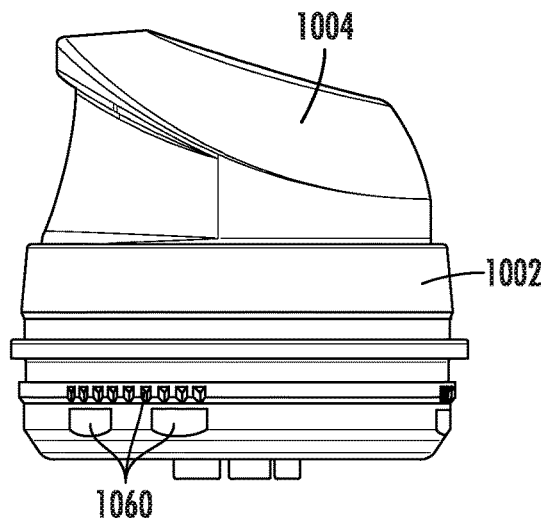
Figure 91:
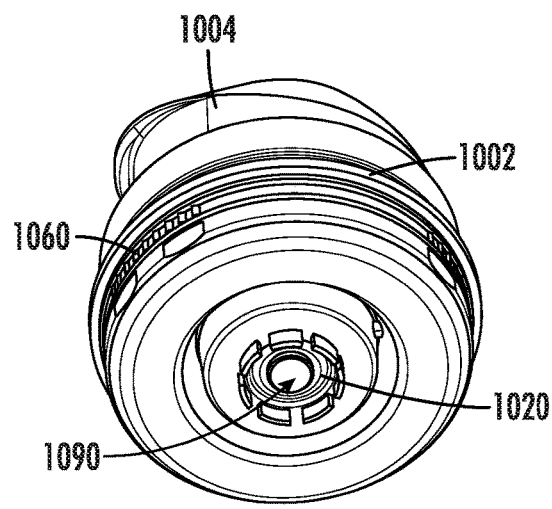

Turing to FIGS. 81-86, another variation of the dispensing pump 900 is indicated at 900B. Again, the dispensing pump may in all aspects be identical to the embodiment 900 with the same components except the baffle 970B which is best seen in FIGS. 83-86. The baffle 970B includes a central nipple portion 972 with standoffs 976 and another modified flange portion 974B. The flange portion 974B is again shorter in radial length and includes an upwardly turned rim 982 extending upwardly from the outer peripheral edge of the flange portion 974B. The rim 982 turns upwardly into an annular space in the bottom wall of the pump base 902 and maintains a flow channel between the baffle 970B and the pump base 902. The flange 974B also includes the previously noted detents 978. FIG. 86 best illustrates the flow path of product from the container 914 around the baffle 970B and into the inlet port 920.

Turning now to FIGS. 87-92, still another exemplary embodiment of a dispensing pump is illustrated and generally indicated at 1000. The dispensing pump 1000 is substantially similar to the above-described embodiment 800 in structure and function with two exceptions which also resolve the same issues described with excess air in the headspace and inconsistent pumping volumes. The pump 1000 may also include the same venting structures 1060 on the outer peripheral surfaces of the pump base 1002. However, in the place of the baffle, the inlet port 1020 is modified so that it is formed flush or co-planar with the bottom surface of the pump base 1001 and the ball valve is replaced with a disc valve 1090.

The major working components of dispensing pump 1000 are the same with the exception of the shape of the inlet port 1020 and the disk valve 1090. The dispensing pump 1000 comprises a pump base 1002, a dispensing head 1004 and a polymer compression spring assembly 1006. The pump base 1002 is snap received within the neck 1012 of a container or jar 1014. The pump base 1002 may be provided with the same peripheral vents 1060 or relief areas as described above.

A cup-shaped cap 1016 is snap received over the dispensing head 1004. The exemplary embodiment 1000 also further includes a piston follower 1018. As similarly descried above, the accumulator cup 1010 has an inlet port 1020 formed in the bottom wall thereof. The disk valve 1022 is located within the inlet port 1020 and has a central body portion 1092 which extends through the inlet port and a peripheral flange portion 1094 which is seated within the accumulator cup 1010.

Piston stem 1034 and piston seal 1046 are assembled with the dispensing head 1004 as also described above.

The compression spring assembly 1006 is the same as described hereinabove comprising a cylindrical slotted tubular spring element 1048 and first and second loading cones integrally formed with the pump base 1002 and the piston stem 1034.

Figure 92:
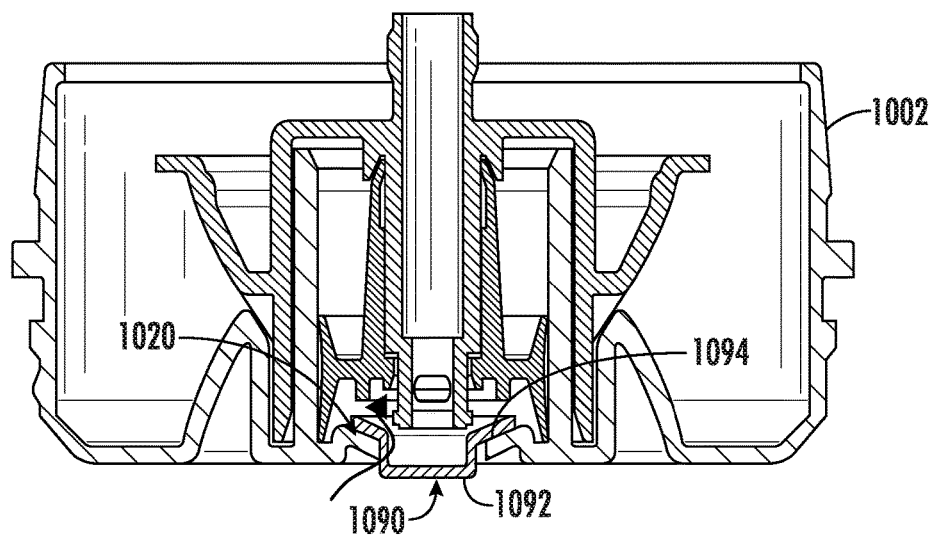
FIG. 92 is a cross-sectional view of the pump base taken along line 92-92 of FIG. 87.

As best seen in FIG. 92, the shortened inlet port 1020 reduces headspace between the bottom surface of the pump base and the product and can no longer dip into product before air in the headspace is evacuated.

It can therefore be seen that the exemplary embodiments provide unique and novel dispensing pump assemblies in which all the discrete components may be molded from a single plastic material or related recyclable plastics to facilitate single stream plastic recycling. Further, the all plastic compression spring assemblies can be advantageously used in all plastic dispensing pumps which can then also be easily recycled.

While there is shown and described herein certain specific structures embodying various embodiments of the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims

What is claimed is:

1. A dispensing pump comprising:
   a pump base;
   an accumulator within the pump base;
   an inlet port within the accumulator;
   a valve within the inlet port;
   a baffle disposed over the inlet port;
   a dispensing head having an outlet nozzle and an inlet stem;
   a piston stem having an interior flow passage, an upper end received with the inlet stem of the dispensing head and an opposing lower end with an inlet opening extending into said accumulator;
   a piston seal at said lower end of said piston stem, said piston seal engaging said accumulator; and
   a compression spring captured between the piston stem and the pump base, said compression spring comprising:
      a slotted tubular spring element formed from a tensile polymer material;
      a first loading cone disposed concentrically around the accumulator at a first end of said slotted tubular spring element; and
      a second loading cone disposed concentrically around the piston stem at said second end of said slotted tubular spring element, said second loading cone being axially compressible with said piston stem and said dispensing head toward the first loading cone, whereby said slotted tubular spring element radially expands to create an opposing extension spring force.

2. The dispensing pump of claim 1 wherein said first loading cone is annular and is integrally molded with the pump base and wherein said second loading cone is integrally molded with the piston stem.

3. A dispensing pump comprising:
- a pump base;
- an accumulator within the pump base;
- an inlet port within the accumulator wherein an external surface of said inlet port is coplanar with an external bottom surface of said pump base;
- a valve within the inlet port;
- a dispensing head having an outlet nozzle and an inlet stem;
- a piston stem having an interior flow passage, an upper end received with the inlet stem of the dispensing head and an opposing lower end with an inlet opening extending into said accumulator;
- a piston seal at said lower end of said piston stem, said piston seal engaging said accumulator; and
- a compression spring captured between the piston stem and the pump base, said compression spring comprising:
  - a slotted tubular spring element formed from a tensile polymer material;
  - a first loading cone disposed concentrically around the accumulator at a first end of said slotted tubular spring element; and
  - a second loading cone disposed concentrically around the piston stem at said second end of said slotted tubular spring element, said second loading cone being axially compressible with said piston stem and said dispensing head toward the first loading cone,
  whereby said slotted tubular spring element radially expands to create an opposing extension spring force.

4. The dispensing pump of claim 3 wherein said first loading cone is annular and is integrally molded with the pump base and wherein said second loading cone is integrally molded with the piston stem.

* * * * *